United States Patent
Hassan

(10) Patent No.: US 10,938,485 B2
(45) Date of Patent: Mar. 2, 2021

(54) ERROR CONTROL CODING WITH DYNAMIC RANGES

(71) Applicant: Microsoft Technology Licensing, LLC, Redmond, WA (US)

(72) Inventor: Amer Aref Hassan, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 16/387,802

(22) Filed: Apr. 18, 2019

(65) Prior Publication Data

US 2020/0336246 A1    Oct. 22, 2020

(51) Int. Cl.
*H04L 1/00* (2006.01)
*H04B 10/66* (2013.01)
*H04J 14/02* (2006.01)

(52) U.S. Cl.
CPC ........... *H04B 10/66* (2013.01); *H04L 1/0045* (2013.01); *H04J 14/02* (2013.01)

(58) Field of Classification Search
CPC ..... H04L 1/0045; H04L 1/0038; H04B 10/66; H04B 10/70; H04B 10/60; H04B 10/67; H04B 10/695; G06F 11/10; H04J 14/02
See application file for complete search history.

(56) References Cited

U.S. PATENT DOCUMENTS

| | | |
|---|---|---|
| 3,984,190 A | 10/1976 | Barrett et al. |
| 4,150,284 A | 4/1979 | Trenkler et al. |
| 4,476,495 A | 10/1984 | Fujisawa et al. |
| 4,763,326 A | 8/1988 | Krick |
| 4,829,596 A | 5/1989 | Barina |
| 5,410,147 A | 4/1995 | Riza et al. |
| 5,510,919 A | 4/1996 | Wedding |
| 5,737,366 A | 4/1998 | Gehlot |
| 5,793,880 A | 8/1998 | Constant |
| 6,148,428 A | 11/2000 | Welch et al. |
| 6,366,381 B1 | 4/2002 | Anderson |
| 6,424,444 B1 | 7/2002 | Kahn et al. |

(Continued)

FOREIGN PATENT DOCUMENTS

| | | |
|---|---|---|
| EP | 0234730 B1 | 7/1992 |
| EP | 0975104 A1 | 1/2000 |

(Continued)

OTHER PUBLICATIONS

Cuccato et al., Complete and compact 32 channel system for time correlated single-photon counting measurements, Oct. 2013, IEEE, vol. 5, No. 5, pp. 1 to 15.*

(Continued)

*Primary Examiner* — Shelly A Chase

(74) *Attorney, Agent, or Firm* — Schwegman Lundberg & Woessner, P.A.

(57) ABSTRACT

Disclosed in some examples are methods, systems, optical devices, and machine readable mediums for utilizing uncertainty ranges along with ECC in power level modulation schemes. Photon counts within the uncertainty ranges are not demultiplexed and the data is recovered later by the ECC algorithm without retransmissions. This improves performance by reducing error rate by changing demultiplexing behavior to take advantage of characteristics in the ECC algorithms.

20 Claims, 10 Drawing Sheets

(56) References Cited

U.S. PATENT DOCUMENTS

| | | | |
|---|---|---|---|
| 6,433,904 B1 | 8/2002 | Swanson et al. | |
| 6,437,893 B1 | 8/2002 | Rivollet et al. | |
| 6,490,067 B2 | 12/2002 | Bloom et al. | |
| 6,580,535 B1 | 6/2003 | Schonfelder | |
| 6,609,139 B1 | 8/2003 | Dultz et al. | |
| 6,748,083 B2 | 6/2004 | Hughes et al. | |
| 6,816,726 B2 | 11/2004 | Lysejko et al. | |
| 6,851,086 B2 | 2/2005 | Szymanski | |
| 6,868,236 B2 | 3/2005 | Wiltsey et al. | |
| 6,915,076 B1 | 7/2005 | Mittal et al. | |
| 6,963,175 B2 | 11/2005 | Archenhold et al. | |
| 7,032,238 B2 | 4/2006 | Parnell et al. | |
| 7,050,723 B2 | 5/2006 | Katagiri et al. | |
| 7,110,681 B1 | 9/2006 | Mizuochi | |
| 7,113,708 B1 | 9/2006 | Creaney et al. | |
| 7,139,491 B2 | 11/2006 | Katagiri et al. | |
| 7,177,320 B2 | 2/2007 | Lysejko et al. | |
| 7,212,742 B2 | 5/2007 | Peddanarappagari et al. | |
| 7,286,762 B2 | 10/2007 | Elahmadi et al. | |
| 7,305,091 B1 | 12/2007 | Hirano | |
| 7,307,569 B2 | 12/2007 | Vrazel et al. | |
| 7,477,849 B2 | 1/2009 | Ahmed et al. | |
| 7,489,875 B2 | 2/2009 | Murphy | |
| 7,606,272 B2 | 10/2009 | Beausoleil et al. | |
| 7,689,130 B2 | 3/2010 | Ashdown | |
| 7,830,575 B2 | 11/2010 | Moon et al. | |
| 7,844,186 B2 | 11/2010 | Dorrer et al. | |
| 7,936,829 B2 | 5/2011 | Romero et al. | |
| 7,970,349 B2 | 6/2011 | Chen et al. | |
| 7,983,570 B2 | 7/2011 | Han et al. | |
| 7,986,783 B2 | 7/2011 | Ikushima et al. | |
| 8,155,175 B2 | 4/2012 | Olgaard | |
| 8,213,801 B2 | 7/2012 | Nien et al. | |
| 8,295,485 B2 | 10/2012 | Yuan et al. | |
| 8,552,659 B2 | 10/2013 | Ashdown et al. | |
| 8,559,378 B2 | 10/2013 | Schaepperle | |
| 8,873,965 B2 | 10/2014 | Giustiniano et al. | |
| 8,879,925 B2 | 11/2014 | Akiyama et al. | |
| 8,929,402 B1 | 1/2015 | Hughes | |
| 8,948,600 B2 | 2/2015 | Kwon et al. | |
| 9,014,551 B1 * | 4/2015 | Stooke | H04B 10/70 398/140 |
| 9,094,151 B2 | 7/2015 | Prez De et al. | |
| 9,386,587 B2 | 7/2016 | Hu et al. | |
| 9,401,766 B2 | 7/2016 | Yuan et al. | |
| 9,608,733 B2 | 3/2017 | Pavlas et al. | |
| 9,787,404 B2 | 10/2017 | Cesnik | |
| 9,800,399 B2 | 10/2017 | Tanzilli et al. | |
| 9,813,127 B2 | 11/2017 | George et al. | |
| 9,826,540 B1 | 11/2017 | Li et al. | |
| 9,859,977 B2 | 1/2018 | Zhao et al. | |
| 9,946,723 B2 | 4/2018 | Lawrence | |
| 10,117,120 B2 | 10/2018 | Sun et al. | |
| 10,135,540 B2 | 11/2018 | Medra et al. | |
| 10,182,480 B2 | 1/2019 | Scapa et al. | |
| 10,187,171 B2 | 1/2019 | Doster et al. | |
| 10,193,722 B2 | 1/2019 | Guha | |
| 10,219,695 B2 | 3/2019 | Bhadri et al. | |
| 10,230,468 B2 | 3/2019 | Mansouri Rad et al. | |
| 10,231,687 B2 | 3/2019 | Kahn et al. | |
| 10,333,622 B2 | 6/2019 | Bhoja et al. | |
| 10,404,379 B2 | 9/2019 | Shiraishi | |
| 10,476,728 B2 | 11/2019 | Zhang et al. | |
| 10,686,530 B1 | 6/2020 | Hassan | |
| 10,742,325 B1 | 8/2020 | Hassan et al. | |
| 10,742,326 B1 | 8/2020 | Hassan et al. | |
| 2001/0033406 A1 | 10/2001 | Koike et al. | |
| 2002/0171899 A1 | 11/2002 | Gurusami et al. | |
| 2002/0196510 A1 | 12/2002 | Hietala et al. | |
| 2003/0030873 A1 | 2/2003 | Hietala et al. | |
| 2003/0032391 A1 | 2/2003 | Schweinhart et al. | |
| 2003/0072050 A1 | 4/2003 | Vrazel et al. | |
| 2003/0076569 A1 | 4/2003 | Stevens | |
| 2003/0223762 A1 | 12/2003 | Ho et al. | |
| 2003/0231676 A1 | 12/2003 | Buckman et al. | |
| 2003/0235415 A1 | 12/2003 | Peters et al. | |
| 2004/0013429 A1 | 1/2004 | Duelk et al. | |
| 2004/0028412 A1 | 2/2004 | Murphy | |
| 2004/0057733 A1 | 3/2004 | Azadet et al. | |
| 2005/0012033 A1 | 1/2005 | Stern et al. | |
| 2005/0100336 A1 | 5/2005 | Mendenhall et al. | |
| 2005/0213966 A1 | 9/2005 | Chown et al. | |
| 2006/0088110 A1 | 4/2006 | Romero et al. | |
| 2006/0115272 A1 | 6/2006 | Minato et al. | |
| 2006/0127102 A1 | 6/2006 | Roberts et al. | |
| 2006/0165190 A1 | 7/2006 | Tamaki et al. | |
| 2006/0204247 A1 | 9/2006 | Murphy | |
| 2007/0014286 A1 | 1/2007 | Lai | |
| 2007/0041731 A1 | 2/2007 | Yasumoto et al. | |
| 2007/0092265 A1 | 4/2007 | Vrazel et al. | |
| 2007/0160212 A1 | 7/2007 | Zavriyev et al. | |
| 2007/0165862 A1 | 7/2007 | Young et al. | |
| 2007/0201692 A1 | 8/2007 | Furusawa et al. | |
| 2007/0201867 A1 | 8/2007 | Delew et al. | |
| 2007/0222654 A1 | 9/2007 | Vrazel et al. | |
| 2007/0280684 A1 | 12/2007 | Onoda et al. | |
| 2008/0019523 A1 | 1/2008 | Fuse et al. | |
| 2008/0129564 A1 | 6/2008 | Kitayama et al. | |
| 2008/0138087 A1 | 6/2008 | Snyder | |
| 2008/0166131 A1 | 7/2008 | Hudgins et al. | |
| 2008/0166135 A1 | 7/2008 | Ann | |
| 2008/0224635 A1 | 9/2008 | Hayes | |
| 2008/0240734 A1 | 10/2008 | Fuse | |
| 2008/0272276 A1 | 11/2008 | Huang et al. | |
| 2009/0148058 A1 | 6/2009 | Dane et al. | |
| 2009/0245809 A1 | 10/2009 | Nakamoto | |
| 2009/0269055 A1 | 10/2009 | Butler et al. | |
| 2010/0054754 A1 | 3/2010 | Miller et al. | |
| 2010/0142965 A1 | 6/2010 | Walewski et al. | |
| 2010/0182294 A1 | 7/2010 | Roshan et al. | |
| 2010/0221011 A1 | 9/2010 | Pinceman et al. | |
| 2011/0052195 A1 | 3/2011 | Karstens | |
| 2011/0076026 A1 | 3/2011 | Ledentsov et al. | |
| 2011/0234436 A1 | 9/2011 | Bogoni et al. | |
| 2011/0255866 A1 | 10/2011 | Van veen et al. | |
| 2011/0280576 A1 | 11/2011 | Chan et al. | |
| 2012/0057506 A1 | 3/2012 | Kumar | |
| 2012/0063596 A1 | 3/2012 | Brodsky et al. | |
| 2012/0063774 A1 | 3/2012 | Niibe et al. | |
| 2012/0128367 A1 | 5/2012 | Yamada | |
| 2013/0004172 A1 | 1/2013 | Sugawa et al. | |
| 2013/0188956 A1 | 7/2013 | Abe et al. | |
| 2013/0216219 A1 | 8/2013 | Honda et al. | |
| 2013/0236171 A1 | 9/2013 | Saunders | |
| 2013/0236194 A1 | 9/2013 | Saunders et al. | |
| 2013/0287403 A1 | 10/2013 | Roberts | |
| 2014/0199075 A1 | 7/2014 | Huh et al. | |
| 2014/0312777 A1 | 10/2014 | Shearer et al. | |
| 2014/0313387 A1 | 10/2014 | Vogelsang et al. | |
| 2014/0321859 A1 | 10/2014 | Gui et al. | |
| 2014/0321863 A1 | 10/2014 | Diab | |
| 2015/0063476 A1 | 3/2015 | Wang et al. | |
| 2015/0071651 A1 | 3/2015 | Asmanis et al. | |
| 2015/0071653 A1 | 3/2015 | Robinson et al. | |
| 2015/0098705 A1 | 4/2015 | Motley | |
| 2015/0147069 A1 | 5/2015 | Brandt-pearce et al. | |
| 2015/0222359 A1 | 8/2015 | Kai et al. | |
| 2015/0222366 A1 | 8/2015 | Asmanis et al. | |
| 2015/0318928 A1 | 11/2015 | Yoo et al. | |
| 2015/0365172 A1 | 12/2015 | Luo et al. | |
| 2016/0036525 A1 | 2/2016 | Pirkl | |
| 2016/0080087 A1 | 3/2016 | Koike-akino et al. | |
| 2016/0119096 A1 | 4/2016 | Sun et al. | |
| 2016/0266054 A1 | 9/2016 | Cao et al. | |
| 2017/0063466 A1 | 3/2017 | Wang et al. | |
| 2017/0099139 A1 | 4/2017 | Han et al. | |
| 2017/0168472 A1 | 6/2017 | Ando et al. | |
| 2017/0207854 A1 | 7/2017 | Blumkin et al. | |
| 2017/0250780 A1 | 8/2017 | Ge et al. | |
| 2017/0302383 A1 | 10/2017 | Medra et al. | |
| 2017/0325179 A1 | 11/2017 | Ameixieira | |
| 2017/0366368 A1 | 12/2017 | Crayford et al. | |
| 2018/0076836 A1 | 3/2018 | Zhu et al. | |
| 2018/0145753 A1 | 5/2018 | Ashrafi et al. | |

(56) References Cited

U.S. PATENT DOCUMENTS

| | | |
|---|---|---|
| 2018/0199378 A1 | 7/2018 | Son et al. |
| 2018/0205465 A1 | 7/2018 | Tanaka et al. |
| 2018/0205503 A1 | 7/2018 | Chen et al. |
| 2018/0213305 A1 | 7/2018 | Campos et al. |
| 2018/0227162 A1 | 8/2018 | Tokuhiro |
| 2018/0227651 A1 | 8/2018 | Brodsky et al. |
| 2018/0262291 A1 | 9/2018 | Doster et al. |
| 2018/0279270 A1 | 9/2018 | Sano et al. |
| 2018/0332373 A1 | 11/2018 | Wey et al. |
| 2018/0337816 A1 | 11/2018 | Herath et al. |
| 2019/0017824 A1 | 1/2019 | Qiu et al. |
| 2019/0081702 A1 | 3/2019 | Laycock et al. |
| 2019/0110084 A1 | 4/2019 | Jia et al. |
| 2019/0140741 A1 | 5/2019 | Cheng et al. |
| 2019/0149236 A1 | 5/2019 | Wang et al. |
| 2019/0191383 A1 | 6/2019 | Dang et al. |
| 2019/0214852 A1 | 7/2019 | Park |
| 2019/0239753 A1 | 8/2019 | Wentz |
| 2019/0245646 A1 | 8/2019 | Robert Safavi et al. |
| 2019/0280809 A1 | 9/2019 | Cho et al. |
| 2019/0312694 A1 | 10/2019 | Jia et al. |
| 2019/0317286 A1 | 10/2019 | Seyedi et al. |
| 2019/0317315 A1 | 10/2019 | Wang et al. |
| 2019/0376820 A1 | 12/2019 | Jones et al. |
| 2020/0092009 A1 | 3/2020 | Böcherer et al. |
| 2020/0106529 A1 | 4/2020 | Nakamura et al. |
| 2020/0336203 A1 | 10/2020 | Hassan |
| 2020/0336204 A1 | 10/2020 | Hassan |
| 2020/0336213 A1 | 10/2020 | Hassan |
| 2020/0336214 A1 | 10/2020 | Hassan et al. |
| 2020/0336216 A1 | 10/2020 | Hassan |
| 2020/0336217 A1 | 10/2020 | Hassan et al. |
| 2020/0336218 A1 | 10/2020 | Hassan et al. |
| 2020/0336237 A1 | 10/2020 | Hassan |
| 2020/0336243 A1 | 10/2020 | Hassan |

FOREIGN PATENT DOCUMENTS

| | | |
|---|---|---|
| EP | 1508989 A2 | 2/2005 |
| EP | 2903187 A1 | 8/2015 |
| EP | 3244554 A1 | 11/2017 |
| RU | 2009104211 A | 8/2010 |
| WO | 0077962 A1 | 12/2000 |
| WO | 02082694 A1 | 10/2002 |
| WO | 2007083157 A1 | 7/2007 |
| WO | 2013097088 A1 | 7/2013 |

OTHER PUBLICATIONS

International Search Report and Written Opinion issued PCT Application No. PCT/US2020/024533, dated Aug. 7, 2020, 11 pages.*
International Search Report and Written Opinion issued in PCT Application No. PCT/US2020/024534, dated Jul. 2016, 2020.*
"Non Final Office Action Issued in U.S. Appl. No. 16/387,827", dated May 27, 2020, 9 Pages.
Khan, et al., "Visible Light Communication using Wavelength Division Multiplexing for Smart Spaces", In Proceedings of the IEEE Consumer Communications and Networking Conference (CCNC), Jan. 14, 2012, pp. 230-234.
"International Search Report and Written Opinion Issued in PCT Application No. PCT/US2019/063121", dated Apr. 1, 2020, 13 Pages.
"Non Final Office Action Issued in U.S. Appl. No. 16/388,340", dated May 8, 2020, 20 Pages.
"Non Final Office Action Issued in U.S. Appl. No. 16/388,393", dated May 7, 2020, 20 Pages.
"International Search Report and Written Opinion Issued in PCT Application No. PCT/US2019/063124", dated Mar. 27, 2020, 11 Pages.
"LDM | Layered Division Multiplexing | Power Division Multiplexing", Retrieved from https://web.archive.org/web/20170220135434/http://www.rfwireless-world.com/Terminology/LDM-vs-TDM-vs-FDM.html, Feb. 20, 2017, 5 Pages.
"Notice of Allowance Issued in U.S. Appl. No. 16/387,774", dated Sep. 30, 2019, 8 Pages.
Feng, et al., "Digital Domain Power Division Multiplexing DDO-OFDM Transmission with Successive Interference Cancellation", In Conference on Lasers and Electro-Optics, Jun. 5, 2016, 2 Pages.
Quimby, Richard S., "Photonics and Lasers: An Introduction", In Publications of John Wiley & Sons, Apr. 14, 2006, 533 Pages.
Wu, et al., "Digital Domain Power Division Multiplexed Dual Polarization Coherent Optical OFDM Transmission", In Journal of Computing Research Repository, Jul. 2017, 9 Pages.
"Notice of Allowance Issued in U.S. Appl. No. 16/387,784", dated Mar. 11, 2020, 11 Pages.
"Non Final Office Action Issued in U.S. Appl. No. 16/387,835", dated Feb. 5, 2020, 7 Pages.
"Notice of Allowance Issued in U.S. Appl. No. 16/388,373", dated Feb. 27, 2020, 11 Pages.
"Final Office Action Issued in U.S. Appl. No. 16/388,211", dated Mar. 31, 2020, 16 Pages.
"Non Final Office Action Issued in U.S. Appl. No. 16/387,813", dated Apr. 3, 2020, 10 Pages.
"Non Final Office Action Issued in U.S. Appl. No. 16/387,819", dated Apr. 6, 2020, 11 Pages.
"Non-Final Office Action Issued in U.S. Appl. No. 16/387,756", dated Nov. 18, 2019, 8 Pages.
"Notice of Allowance Issued in U.S. Appl. No. 16/388,178", dated Oct. 1, 2019, 12 Pages.
"Non-Final Office Action Issued in U.S. Appl. No. 16/388,211", dated Oct. 3, 2019, 18 Pages.
"Notice of Allowance Issued in U.S. Appl. No. 16/388,258", dated Nov. 19, 2019, 10 Pages.
"Non-Final Office Action Issued in U.S. Appl. No. 16/388,373", dated Nov. 15, 2019, 9 Pages.
"Poisson Regression", [online]. Retrieved from the Internet: <URL: https://docs.microsoft.com/en-us/azure/machine-learning/studio-module-reference/poisson-regression>, (Jan. 27, 2018), 7 pgs.
"T11.2 / Project xxxx/ Rev 0.5", Information Technology: Fibre Channel—Methodologies for Signal Quality Specification—3 FC-MSQS-3, (Jan. 26, 2017), 22 pgs.
Donovan, James, "How Multiplexing Techniques Enable Higher Speeds on Fiber Optic Cabling", [online]. Retrieved from the Internet: URL: https://www.commscope.com/Blog/How-Multiplexing-Techniques-Enable-Higher-Speeds-on-Fiber-Optic-Cabling/>, (Jul. 25, 2016), 7 pgs.
Quimby, Richard S., Section 24-3. Power Budget in Fiber Optic Link—Receiver Sensitivity, *Photonics and Lasers—An Introduction*, John Wiley & Sons, Inc., Hoboken, New Jersey, (2006), 464-469.
Van Der Bij, Erik, "Fibre Channel Overview", [online]. Retrieved from the Internet: <URL: http://hsi.web.cern.ch/HSI/fcs/spec/overview.htm>, (Aug. 15, 1994), 10 pgs.
Simon, et al., "Performance Analysis and Tradeoffs for Dual-Pulse PPM on Optical Communication Channels with Direct Detection", In Proceedings of the IEEE Transactions on Communications, vol. 52, Issue 11, Nov. 1, 2004, pp. 1969-1979.
Salehi, et al., "Code Division Multiple-Access Techniques in Optical Fiber Networks—Part I: Fundamental Principles", In Proceedings of the IEEE Transactions on Communications, vol. 37, Issue 8, Aug. 1, 1989, pp. 824-833.
"International Search Report and Written Opinion Issued in PCT Application No. PCT/US2020/024536", dated Jul. 6, 2020, 12 Pages.
"International Search Report and Written Opinion issued in PCT Application No. PCT/US2020/024535", dated Jul. 6, 2020, 13 Pages.
Elsherif, et al., "Performance Enhancement of Mapping Multiplexing Technique Utilising Dual-Drive Mach-Zehnder Modulator for Metropolitan Area Networks", In Journal of IET Optoelectronics, vol. 9, Issue 2, Apr. 2015, pp. 108-115.
Feng, et al., "Spectrally Overlaid DDO-OFDM Transmission Enabled by Optical Power Division Multiplexing", In Proceedings of the

(56) References Cited

OTHER PUBLICATIONS

15th International Conference on Optical Communications and Networks, Sep. 24, 2016, 3 Pages.

Han, et al., "Power Division Multiplexing", In Proceedings of IEEE/CIC International Conference on Communications in China, Jul. 27, 2016, 6 Pages.

Linden, et al., "Improvement on Received Optical Power Based Flexible Modulation in a PON by the use of Non-Uniform PAM", In Proceedings of European Conference on Optical Communication, Sep. 17, 2017, 3 Pages.

"International Search Report and Written Opinion issued in PCT Application No. PCT/US2020/014304", dated Jul. 21, 2020, 11 Pages.

"International Search Report and Written Opinion issued in PCT Application No. PCT/US2020/024323", dated Aug. 3, 2020, 11 Pages.

"International Search Report and Written Opinion issued in PCT Application No. PCT/US2020/024328", dated Aug. 3, 2020, 13 Pages.

"International Search Report and Written Opinion issued in PCT Application No. PCT/US2020/024366", dated Jul. 17, 2020, 12 Pages.

"International Search Report and Written Opinion issued in PCT Application No. PCT/US2020/024370", dated Aug. 3, 2020, 12 Pages.

"International Search Report and Written Opinion Issued in PCT Application No. PCT/US2020/024522", dated Jul. 16, 2020, 14 Pages.

"International Search Report and Written Opinion issued in PCT Application No. PCT/US2020/024529", dated Aug. 7, 2020, 11 Pages.

"Notice of Allowance Issued in U.S. Appl. No. 16/388,340", dated Sep. 17, 2020, 13 Pages.

"Notice of Allowance Issued in U.S. Appl. No. 16/388,393", dated Sep. 22, 2020, 13 Pages.

"Non Final Office Action Issued in U.S. Appl. No. 16/388,211", dated Aug. 7, 2020, 18 Pages.

"Notice of Allowance Issued in U.S. Appl. No. 16/387,791", dated Aug. 28, 2020, 19 Pages.

"International Search Report and Written Opinion Issued in PCT Application No. PCT/US2020/024368", dated Jun. 22, 2020, 10 Pages.

"International Search Report and Written Opinion Issued in PCT Application No. PCT/US2020/024325", dated Jun. 18, 2020, 16 Pages.

Hsu, et al., "Multilevel Priority Scheme for Fiber-Optic-Code Division Multiple Access (CDMA) Packet Networks", In Proceedings of IEEE INFOCOM '93 The Conference on Computer Communications, Mar. 29, 1993, pp. 1359-1366.

"Notice of Allowance Issued in U.S. Appl. No. 16/387,813", dated Jul. 23, 2020, 7 Pages.

"Final Office Action Issued in U.S. Appl. No. 16/387,827", dated Oct. 5, 2020, 13 Pages.

"International Search Report and Written Opinion Issued in PCT Application No. PCT/US2020/024533", dated Jul. 16, 2020, 12 Pages.

"International Search Report and Written Opinion Issued in PCT Application No. PCT/US2020/024534", dated Jul. 16, 2020, 11 Pages.

\* cited by examiner

ERROR CONTROL CODING WITH DYNAMIC RANGES

BACKGROUND

Optical communications, such as fiber optic communications utilize a light source at one end that transmits one or more data streams by modulating the data stream into light signals. These light signals pass through a medium such as air or a glass fiber with internally reflective surfaces (a fiber optic fiber) to a receiver which employs a photon detection module to detect the light signals. The detected light is then demodulated back into one or more data streams.

In order to effectively utilize the available light bandwidth, a number of distinct channels may be created by assigning a different light wavelength to each channel. Different data streams may be placed on each channel and transmitted simultaneously over a same medium to a same receiver. This practice is commonly referred to as Wavelength Division Multiplexing (WDM). Some WDM systems allow up to 80 such channels per fiber and per channel bandwidth may be 40 Gbit/second to produce almost 3.1 terabits/second of transmission on a single fiber (not including losses due to overhead).

As a result of this large bandwidth, fiber optic systems are becoming increasingly popular with communication network providers, cloud service providers, and other entities that need to transfer large amounts of data very quickly. In addition to carrying a large amount of data, fiber optics offer other advantages such as: less attenuation than electrical cables—which provides the benefit of utilizing less network infrastructure for longer runs of communication cables; lack of electromagnetic interference; and various other benefits.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
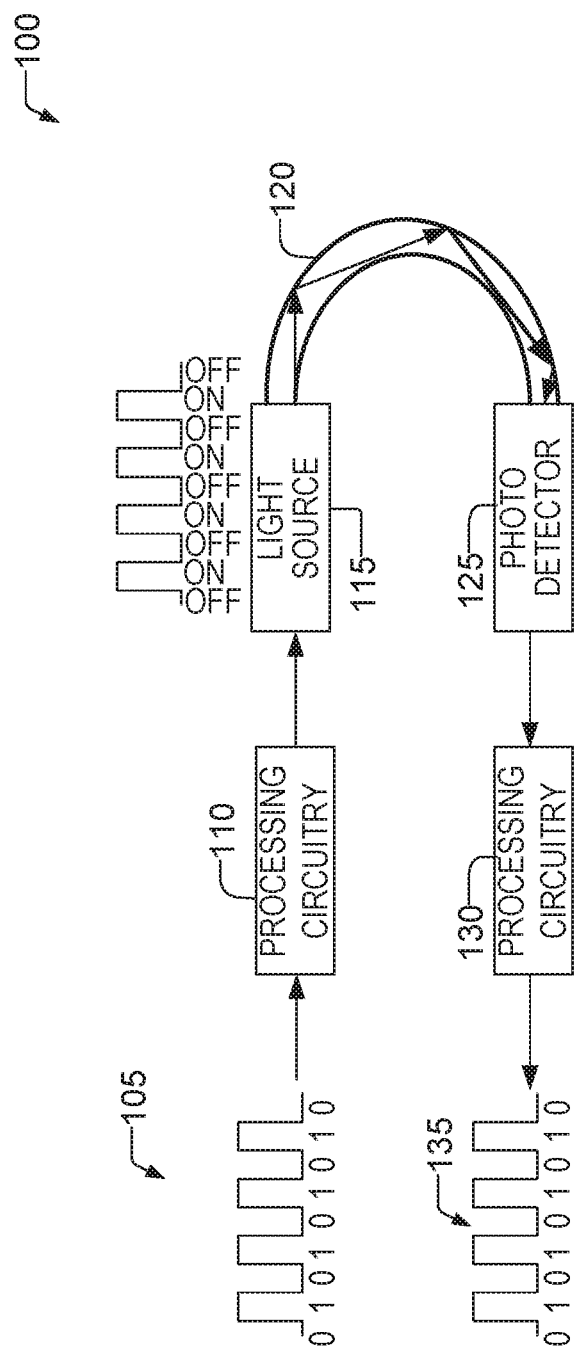
FIG. 1 illustrates components of a simplified optical communication system according to some examples of the present disclosure.

FIG. 1 illustrates components of a simplified optical communication system in the form of a fiber optic system 100 according to some examples of the present disclosure. A data stream 105 may comprise binary data produced by higher network layers that is processed by processing circuitry 110. Processing circuitry 110 may process the data of data stream 105 in one or more ways to prepare it for transmission. Example processing operations performed by the processing circuitry 110 includes applying one or more error correction codes (ECCs), compression algorithms, encryption algorithms, and/or the like. The data, as transformed by the processing circuitry 110, is then passed as a control signal to a light source 115. The light source 115 modulates the data by selectively turning the light source on an off in accordance with the input data according to a modulation scheme. For example, in a simple modulation scheme, each bit may be transmitted during a predetermined period of time (e.g., a timeslot). During a particular timeslot, if the current bit from the input data is a '1', the light source may be turned on during the timeslot and if the current bit from the input data is a '0', the light source may be turned off during the timeslot. Other, more complex modulation schemes may be utilized such as amplitude, phase, or polarization modulation. In some examples, the light may be modulated on a sine wave.

The light produced by the light source then travels over an optical communication path to the receiver. An optical communication path is the path taken by the light source from the transmitting light source to the receiving sensor. This path may be through one or more mediums, such as a single fiber optic fiber, air, or the like. In the example of FIG. 1 the optical communication path travels across a single fiber optic fiber 120. In examples in which the medium is air, the optical communication path may be the alignment of the transmitting light source and the sensor at the receiver.

The receiver includes a photo detector 125 and processing circuitry 130. The photo detector 125 collects a count of a number of photons detected over a detection time period which corresponds to an amount of time that a single bit of the data stream 105 is transmitted. Based upon the photon counts, the photo detector produces a data stream that is then input to the processing circuitry 130 which applies an inverse operation than that was applied by the processing circuitry 110 to produce data stream 135. The goal is to transmit data stream 105 to the receiver as fast as possible while having data stream 135 match data stream 105.

As already noted, WDM may be used to optimize usage of the optical communication path. Other techniques such as Amplitude Modulation (AM), and Digital Domain Power Division Multiplexing (DDPDM) also increase the bandwidth of the medium. As will be made clear, none of these techniques make full use of the entire bandwidth available in the medium and in some cases, these techniques present undesirable drawbacks. For example, none of these techniques allow for two different transmitters with two different light sources to transmit simultaneously at a same wavelength and through the same communication path (e.g., fiber) as the receiver. Further, the decision ranges used to make bit assignments to each stream are equal for each bit combination in these techniques (the photon count range corresponding to a detected bit combination). These symmetric decision ranges would present difficulty in situations where different transmitters have slightly different power levels. Finally, for DDPDM, the decoding, demodulation, and interference cancellation used are very complicated and require significant processing resources. For example, DDPDM demodulates and remodulates a same signal several times at the receiver. This increases device cost and/or decoding time.

Another technique, Optical Power Level Modulation (OPLM) described by co-pending application "Power Switching for Systems Implementing Throughput Improvements for Optical Communications" by Amer Hassan and Edward Giaimo, U.S. patent application Ser. No. 16/387,774, filed on the same day as the present application, which is hereby incorporated by reference in their entirety, allows for the transmission of multiple streams of data across a same optical communication path (e.g., a same fiber optic fiber) using different light sources transmitting at different power levels with a same wavelength. OPLM techniques may be combined with a variety of modulation schemes, such as simple modulation schemes in which a light source is turned on for transmitting a '1' and turned off to transmit a '0' and more complicated schemes such as AM, DDPDM, WDM, and the like. In OPLM systems each light source corresponding to each stream transmits at a same frequency and on the same optical communication path using a different power level. The receiver demultiplexes the data for each stream by applying one or more detection models to the photon counts observed at the receiver to determine likely bit assignments for each stream.

Since each light source is transmitting at different power levels, a first light source activated alone, a second light source activated alone, or both activated together produces different photon counts detected at the receiver. A detection model in the form of a Poisson distribution (or other detection model) may calculate probabilities that each light source is activated based upon these photon counts. This may be used to assign bit values to each stream. Thus, detection models such as Poisson distributions may be utilized to demultiplex the streams. For example, consider a system with two data streams and two light sources using a modulation scheme where the light source activating signals a '1' in the bitstream and the light source being off signals a '0' in the bitstream. In this system, the first model may indicate a probability that the first light source is on and the second light source is off—this corresponds to a bit combination of '1' and '0.' The second model may indicate a probability that the second light source is on and the first light source is off—this corresponds to a bit combination of '0' and '1.' The third model may indicate a probability that both light sources are activated and thus corresponds to a bit combination of '1' and '1'.

As a result, multiple streams of data from multiple light sources may be sent on a single optical link which may double, triple, quadruple, or more the bandwidth of a single channel on a single link. In addition, the problems of other techniques may be avoided. For example, the decision ranges (e.g., the Poisson distributions) for each bit combination may not be the same as the decision ranges for other bit combinations. This allows for light sources of differing power levels. Furthermore, detection is very simple, unlike DDPDM. Additionally, since multiple light sources may be used, the system may support multiple users on a same communication path (e.g., a same fiber optic fiber).

Figure 2:
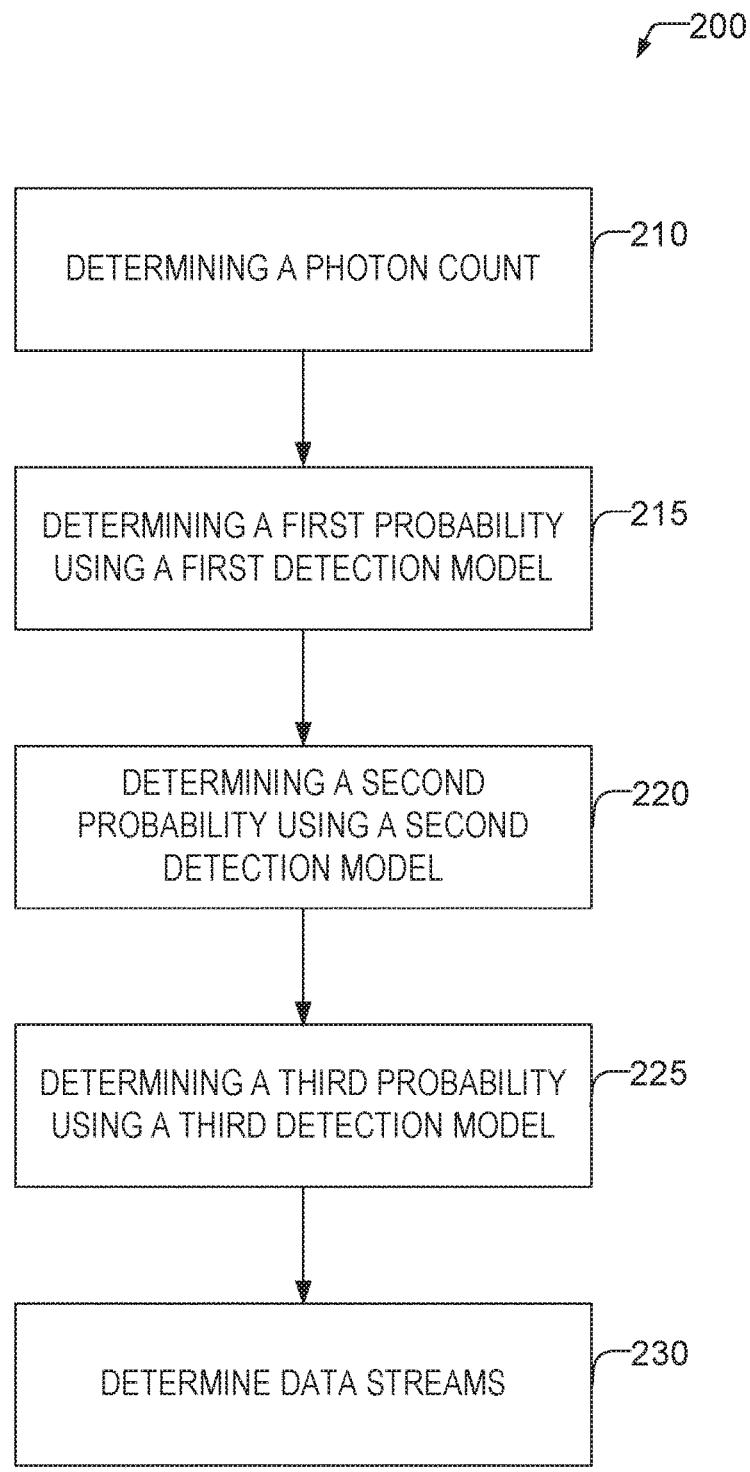
FIG. 2 illustrates an OPLM method performed by a receiver in decoding data according to some examples of the present disclosure.

FIG. 2 illustrates an OPLM method 200 performed by a receiver in demultiplexing data according to some examples of the present disclosure. At operation 210 the receiver may determine a photon count of photons observed during a predetermined period of time. The predetermined period of time may be a period of time (e.g., a timeslot) whereby the transmitters and receivers are synchronized to transmit one or more bits of a bit stream (e.g., bits of a packet). At operation 215, the receiver determines a first probability using the photon count and a first detection model that a first light source corresponding to a first data stream is on at a first power level and a second light source corresponding to a second data stream is off. At operation 220, the receiver determines a second probability using the photon count and a second detection model that a first light source corresponding to a first data stream is off and a second light source corresponding to a second data stream is on at a second power level. At operation 225, the receiver determines a third probability using the photon count and a third detection model that the first light source is on at the first power level and the second light source is on at the second power level.

The detection models may be Poisson probability distributions, machine learned models (e.g., neural networks, regression models, clustering models), decision trees, and the like. For example, as noted, a first light source transmitting at a first power level alone, a second light source transmitting at a second power level alone, and both the first and second light sources transmitting together may produce different average number of photons that strike a receiver. Thus, the probability of a particular combination of light sources causing those photons to strike the receiver may be modeled using Poisson distributions. These Poisson distributions may be utilized as detection models.

At operation 230, the system may determine bit values for the first and second data streams based upon the first, second, and third probabilities. For example, a model producing a highest probability value may be selected and bit values corresponding to that model may be assigned to the bit stream. As noted, the detection models may correspond to bit-values of the various data streams. In some examples, a value of '0' for both bit streams may be determined (e.g., before operations 215, 220, and 225 or during operation 230) by comparing the photon count to a predetermined minimum threshold. In other examples, a separate model may be used for a value of '0' for both bit streams. The method 200 is utilized for two light sources and two bit streams, but may be applied for additional light sources with additional bitstreams. In yet other examples, a single model may output bit assignments.

The OPLM system solves the technical problem of efficient bandwidth utilization in optical communications without the drawbacks of previous approaches discussed above. For example, this method allows for multiple data streams transmitted using a single light source or multiple data streams transmitted using multiple light sources. In the present disclosure, any interference from multiple light sources are accounted for by the detection models which are trained using any such interference. Also, due to the possibility that the models may have unequal decision ranges, the use of different light sources with different power levels does not pose a problem like it does with AM and DDPDM. Furthermore, the models may adapt over time to factor in aging transmitter circuitry. In contrast to DDPDM, the present disclosure does not require remodulation of a received signal by doing a successive interference cancellation. Instead, the present disclosure utilizes average photon counts for a particular bit combination. Because the disclosed detection models are relatively simple probability distributions, the process of decoding and demultiplexing the data streams may use comparatively simple, cheap, and fast hardware and/or software to demultiplex the input rather than needing more complex hardware such as necessary in approaches using successive interference cancellation.

OPLM uses a training sequence to determine the detection models. For example, by instructing each light source to activate alone, and in combination with each other light source to determine average photon counts for each combination. The average photon counts may be used to build the detection models, such as Poisson probability models, or to train a supervised or unsupervised machine-learning model. During operation, the photon counts observed during a transmission time slot are submitted to each detection model and the detection model with the highest probability may be chosen. The bit assignment corresponding to that detection model may be assigned as the bits for each particular stream.

Figure 3:
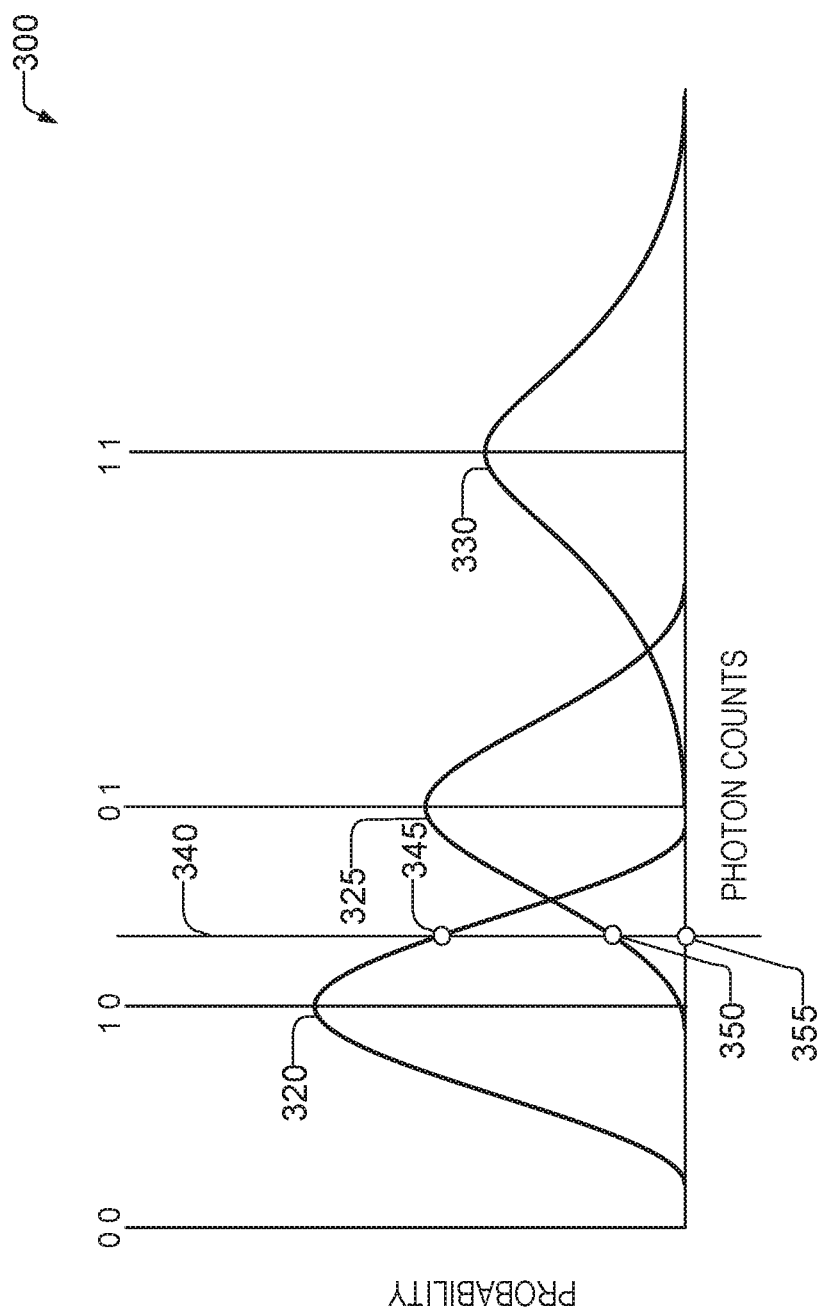
FIG. 3 illustrates a graph of three Poisson probability distributions corresponding to three different power levels graphed with probability as a y-axis and received photon count as the x-axis according to some examples of the present disclosure.

FIG. 3 illustrates a graph 300 of three Poisson probability distributions corresponding to three different power levels graphed with probability as a y-axis and received photon count as the x-axis according to some examples of the present disclosure. FIG. 3 illustrates a first probability distribution 320 of a light source activated at a first power, a second probability distribution 325 of a light source activated at a second power (the second power is greater than the first power), and a third probability distribution 330 of a light source activated at a third power (the third power is greater than the second power) for a given wavelength on a same optical communication path. As the power level of a light source increases, the number of photons output by the light source increases. This increases the number of photons that may be expected to strike the receiver which shifts the probability distributions to the right on the graph of FIG. 3 and flattens the curve (as more variation is to be expected with higher photon counts).

As noted above, the present disclosure utilizes one or more detection models to determine bit values for each bit in each stream that is transmitted over a same optical communication path (e.g., a same fiber) and a same wavelength but using different power levels. The detection models may be Poisson probability distributions. For example, probability distributions 320, 325, and 330 may serve as detection models. The first probability distribution 320 may model the probability that a particular photon count observed at the receiver is caused by the first light source corresponding to a first stream at a first power being switched on and the second light source corresponding to a second stream being switched off. In a simple modulation scheme where the light source being 'on' for the detection period is interpreted as a '1' and the light source being 'off' for the detection period is interpreted as a '0,' the first probability distribution 320 thus models a probability of a corresponding bit value for the first stream of '1' and '0' for the second stream—denoted in the figure as (1,0).

A second probability distribution 325 models the probability that a particular photon count observed at the receiver is caused by the second light source being activated corresponding to a second stream at a second power being on and the first light source corresponding to the first stream is off. Under the aforementioned simple modulation scheme, the second probability distribution 325 thus models a probability of a corresponding bit value for the first stream of 0 and 1 for the second stream—denoted in the figure as (0,1). The second power level is greater than the first power level.

A third probability distribution 330 models the probability that a particular photon count observed at the receiver is caused by both the first and second light sources being activated (and thus more photons are expected to strike the receiver). The third probability distribution 330 thus models a probability of a corresponding bit value for the first stream of 1 and 1 for the second stream—denoted in the figure as (1,1). Multiple light sources that are activated at a same time will produce more photons then each individual light source—thus, shifting a probability distribution even farther to the right. Additionally, the range will increase with power as well—flattening out the Poisson distributions as the additional photons also introduces the potential for more variance.

Thus, the receiver may utilize the observation that the photon counts observed at the receiver follow Poisson distributions based upon the power level of the light source to determine each bit for each bit stream even when both light sources are active at the same time. The receiver may observe the number of photons striking the receiver and calculate the probabilities that the photon count was produced by the first light source alone using the first probability distribution 320, the second light source alone using the second probability distribution 325, and a combination of the first and second light sources using the third probability distribution 330. Based upon these probability calculations a decision may be made using decision logic whether a bit for a first stream is '0' or '1' and whether a bit for a second stream is a '0' or '1.' In one example, the decision logic may be to select bits associated with a detection model corresponding to the highest probability given the observed photon count. For example, if the highest probability is that the photon count was produced by the first light source alone, the first stream may be assigned a bit value of '1' and the second stream may be assigned a bit value of '0.' Alternatively, if the highest probability is that the photon count was produced by the second light source alone, the first stream may be assigned a bit value of 0 and the second stream may be assigned a bit value of 1. Finally, of the highest probability is that the photon count was produced by both light sources, then both streams may be assigned a 1. This scheme may be repeated until the transmitters have finished transmitting data.

As an example, a photon count 340 observed at the receiver may have a first probability 345 according to the first probability distribution 320 and a second probability 350 according to a second probability model and a zero or near zero third probability 355 according to the third probability distribution 330. As first probability 345 is greater than both second probability 350 and third probability 355, probability distribution 320 may be selected—thus it is most probable that the photon count observed was caused by the first light source activated at the first power level and the second light source being off. Since a '1' is represented in this example by turning the light source on and a zero is represented by the light source being off—the most probable bit assignment of the first stream is 1 and for the second stream, the most probable bit assignment is 0.

Figure 4:
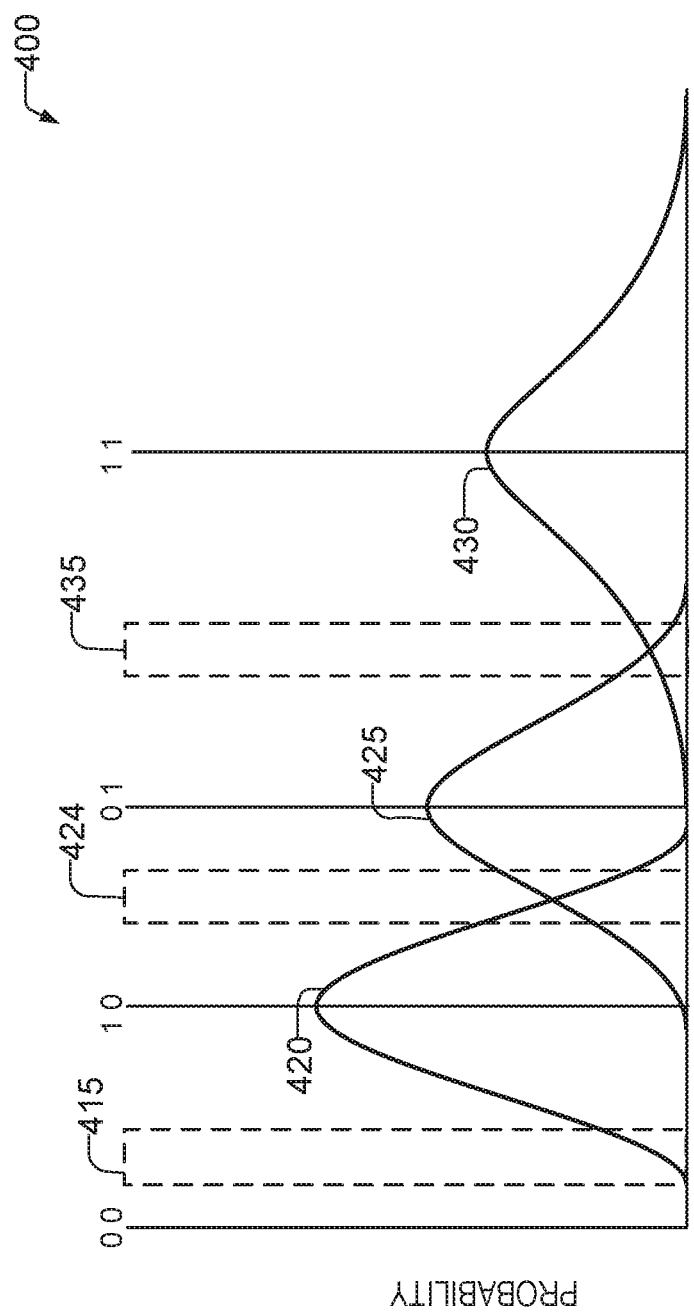
FIG. 4 illustrates a graph of three detection models that are similar to the detection models in FIG. 3 according to some examples of the present disclosure.

FIG. 4 illustrates a graph 400 of three detection models 420, 425, and 430 that are similar to the detection models in FIG. 3. Photon count ranges 415, 424, and 435—represented by dotted boxes—may be photon count ranges where the detection models produce probabilities that are not high, or the difference in probability between two models may be low. For example, photon counts within photon count range 424 produce probabilities for detection models 420 and 425 that are not very high and are very similar to each other. Where the OPLM technique utilizes the bit assignment associated with the model with the highest probability to demultiplex the streams this may involve the receiver choosing a bit assignment that the receiver has a low amount of confidence in. For example, for photon counts to the left of and to the right of the intersection of detection models 420 and 425 (e.g., in range 424), there may be an almost equal probability that the bitstream assignment should be 10 vs. 01.

Choosing an incorrect bit assignment rather than omitting these bits may not be optimal in all circumstances. This is because error correction codes (ECC) may be applied to the data that may achieve better performance during decoding by failing decoding rather than trying to process incorrect data. For example, Reed Solomon codes and bounded distance decoding. As a result, not making a bit assignment where the receiver has a low confidence level of the bit assignment may decrease the error rate after ECC is applied compared to making an erroneous bit assignment.

Disclosed in some examples are methods, systems, optical devices, and machine readable mediums for utilizing uncertainty ranges along with ECC in power level modulation schemes. Photon counts within the uncertainty ranges are not demultiplexed and the data is recovered later by the ECC algorithm without retransmissions. This improves performance by reducing error rate by changing demultiplexing behavior to take advantage of characteristics in the ECC algorithms.

There may be one or more uncertainty ranges and their size and position may be determined by a number of factors. In some examples, the uncertainty ranges may be of a fixed size throughout the execution of the system. In other examples, the uncertainty ranges may change over time periodically, in response to changing characteristics (such as changes in the ECC algorithm, changes in the detection models), or the like. The size of the uncertainty ranges may be determined based upon a system designer, system characteristics, and the like. In other examples, the size of the uncertainty ranges may be set based upon characteristics of the detection models and/or characteristics of the ECC utilized. For example, the more missing bits that the ECC tolerates before requiring a retransmission, the larger the uncertainty ranges may be set. This allows for making more accurate decisions as ranges in which a decision is made feature larger probability differences between detection models.

In examples in which ECC characteristics are used to determine the size of an uncertainty range, an example algorithm to set the size may be to determine a size of uncertainty range that is predicted to produce a number of lost bits that gets closest to, without exceeding, the maximum number of lost bits that are tolerated by the ECC without retransmission. For example, a maximum lost bit rate for a particular data unit size (e.g., the data unit that the ECC operates on) may be determined. This may be calculated, or it may be indicated by the ECC used. The receiver may determine, for each size of uncertainty range, an expected amount of lost bits for the particular data unit size. The expected amount of lost bits for a given uncertainty range size may be supplied by an administrator or designer, and may be stored in a table or other variable. In other examples, the expected amount of lost bits for a given uncertainty range size may be calculated by the receiver using the detection models. For example, the receiver may use historical data to determine which bit combinations are most likely and then, based upon the probability distributions, may calculate, for a given uncertainty range size, the number of expected lost bits that would be expected to be skipped. The receiver may then select an uncertainty range size that has an expected amount of lost bits that is as close as possible, but does not exceed, the maximum lost bit rate tolerance of the ECC algorithm.

In some examples, instead of using ECC characteristics, or in addition to using ECC characteristics, the size and location of the uncertainty ranges may be based upon characteristics of the detection models—individually or in combination with each other. For example, the size and location may be based upon, or be an overlap range of adjacent detection ranges of one or more detection models. For example, in FIG. 4, where the detection ranges of detection models 420 and 425 overlap, and where the detection ranges of detection models 425 and 430 overlap. In some examples, the uncertainty range may be determined based upon the difference in probabilities for a first detection range and a second detection range for a next or previous power level. For example, the uncertainty range may comprise the photon counts where the difference in probability is less than a threshold probability difference. In these examples, the uncertainty range reflects that while the probability of one detection model may be greater than that of a second probability model, the difference is not statistically significant and so the receiver may not have confidence in the bit assignment produced in those ranges.

In examples in which both the ECC characteristics and the detection model characteristics are utilized, the size may be set by utilizing the size calculated by consideration of the ECC characteristics as a maximum size and the characteristics of the detection models may be utilized so long as the size of the uncertainty range does not exceed this maximum size.

Another characteristics of the detection ranges that may be used to set the uncertainty ranges may include the maximum probability values returned by a particular detection model. For example, in FIG. 4, detection model 430 at its highest peak produces a probability that is much less than that of detection model 420 at its highest peak. This may reflect an increased uncertainty regarding detecting these bit combinations. In these examples, a larger uncertainty range for this model may be used to increase the confidence of the receiver. For example, the receiver may calculate a total range for all models based upon the ECC characteristics and then divide that amongst each model based upon the maximum probabilities, overlap ranges, and the like.

Still another characteristic of the detection ranges that may be used may include the range. For example, in FIG. 4, detection model 430 has a higher probability range (e.g., the range of photon counts that produce a probability that is statistically significant) that much greater than detection model 420. This may reflect that a larger set of photon counts may be produced by the transmitters transmitting the corresponding bit combination. In these examples, a larger uncertainty range may be used to increase the confidence of the receiver.

In some examples, the size of a given uncertainty range may be set by considering one or more of the above factors. As one example, the receiver may determine the size based upon one of the above factors (e.g., the overlap ranges) and modify the size based upon one or more of the other factors (e.g., the maximum probabilities and range), but limit the size to a maximum as determined using the ECC characteristics. In other examples, each factor may be used to independently produce a size and each factor may be weighted and summed to produce a final size of an uncertainty range. In some examples, the uncertainty range may be capped at a maximum specified by the ECC characteristics. In still other examples, one or more supervised learning algorithms may train a model that may be used to set the size. Data representative of characteristics used to set the size (e.g., ECC characteristics, model characteristics, and the like) may be labelled with an appropriate size and used to train a machine-learned model. The model may then utilize new data to make new predictions about the proper size of an uncertainty range. Subsequent observed error rates and retransmission rates may be then used to tune the model. Additional information on machine learning algorithms is discussed later with respect to the discussion of FIG. 9.

In addition to the size of the uncertainty range, the position of the uncertainty range may be determined based upon characteristics of the detection models. For example, the uncertainty range may be centered around the photon count at which the probabilities of at least two detection models are equal. In FIG. 4, this corresponds to where the detection models 420, 425, and 430 intersect.

One or more uncertainty ranges may be utilized by the receiver. In some examples, a plurality of uncertainty ranges may be utilized for each decision model. In some examples, a single uncertainty range may be utilized for each decision model. Each uncertainty range may be a same size as all other ranges of uncertainty. In other examples, one or more uncertainty ranges may be different sizes than other ranges of uncertainty.

Each uncertainty range may have an independently determined size and/or position. In other examples, one or more uncertainty ranges may have a size and/or position determined based upon the size and/or position of one or more other ranges of uncertainty. For example, a maximum uncertainty range size may be determined (e.g., based upon the ECC characteristics) and the sizes of each uncertainty range corresponding to each detection model may be determined using a proportion of the total determined based upon the characteristics of each detection model.

In still other examples, the sizes of the detection models may be set initially and may adapt over time. For example, as more photon counts fall within the uncertainty ranges within a given data unit, the uncertainty ranges may shrink to prevent too many missing bits and prevent the ECC algorithm from exceeding the maximum allowable missing data for a particular data unit and to avoid retransmissions.

Figure 5:
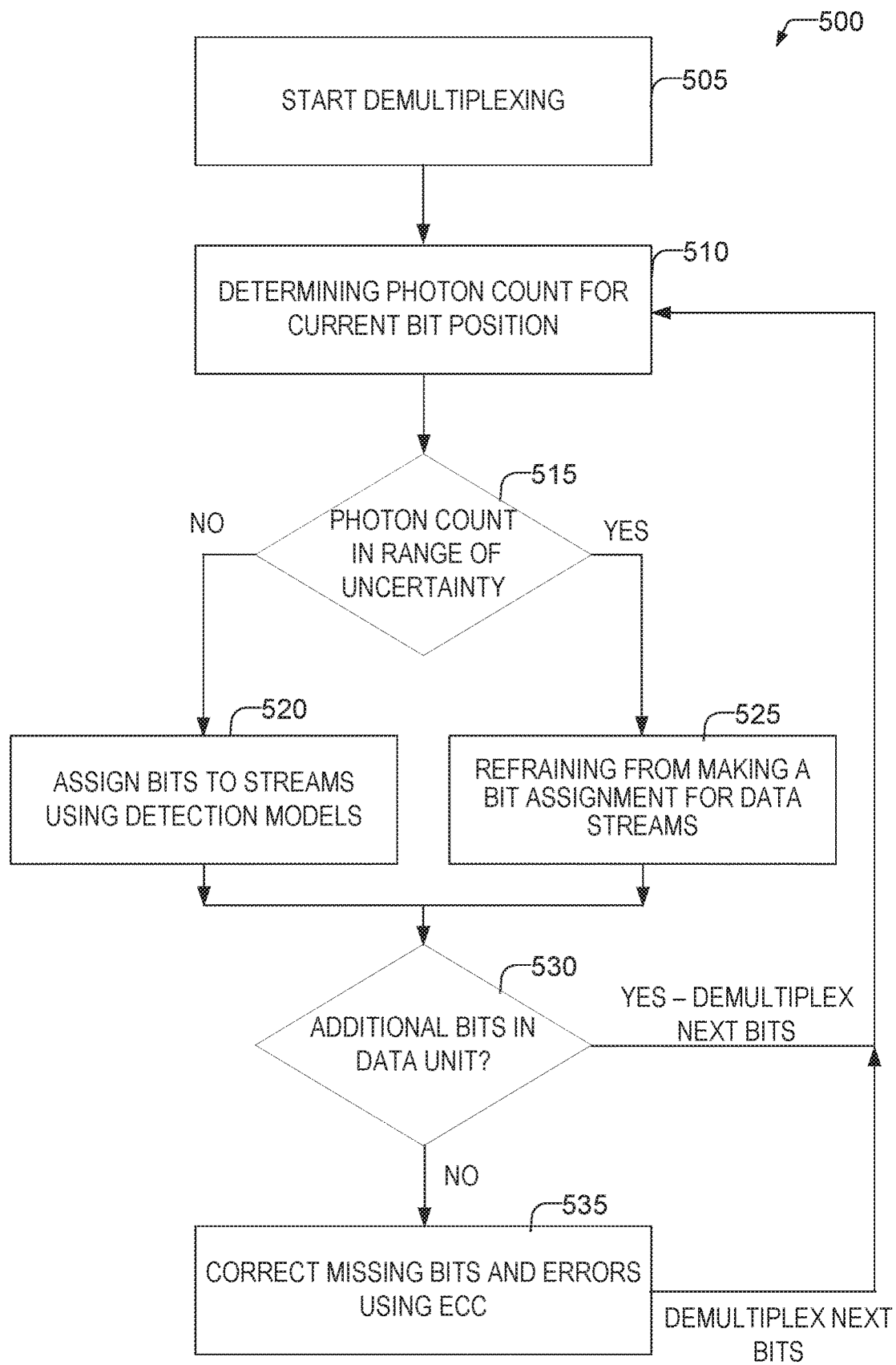
FIG. 5 illustrates a method of demultiplexing multiple data streams transmitted over an optical communication path according to an OPLM method using uncertainty ranges according to some examples of the present disclosure.

FIG. 5 illustrates a method 500 of demultiplexing multiple data streams transmitted over an optical communication path according to an OPLM method using uncertainty ranges according to some examples of the present disclosure. At operation 505 the receiver begins receiving data and demultiplexing the data streams. As noted previously each stream may be sent by one or more different light sources transmitting at different power levels across a same optical communication path (e.g., a same fiber optic fiber) and at a same wavelength.

One or more bits for each stream may be transmitted during a particular time period (e.g., a timeslot). At operation 510 a photon count of photons that are detected at the receiver that are produced by selective activation of the light sources transmitting one or more data streams according to a modulation scheme may be determined.

At operation 515, the photon count is checked to determine if it is within one or more uncertainty ranges. If the photon count is within a defined uncertainty range, then at operation 525 the receiver does not make a bit assignment for the bit position corresponding to the current timeslot for any of the data streams. Thus, the receiver leaves the data positions empty. The next bits that are demultiplexed may be inserted into the bitstream where the bits that would have been demultiplexed would have been placed, or in other examples, the bits may be represented in the bitstream by some data representation such as NULL, or otherwise indicated or marked as unknown.

If at operation 515 the photon count is not within an uncertainty range, bit values may be assigned to the streams using the detection models at operation 520. For example, by performing operations 215-230 of FIG. 2.

In some examples, the ECC algorithm operates on a packet, segment, or other data unit of a determined size of the bitstream. In these examples, at operation 530 the receiver determines if additional data is yet to be received for the present data unit such as a codeword, packet, or other data unit before ECC operations are done to correct or replace any data. This decision may factor in any lost bits in determining whether all data for the data unit have been received. If the determination is yes, then operations return to operation 510 to receive additional data. If the determination is no, then at operation 535 the received data of the data streams in the current data unit may have any missing or incorrect bit assignments corrected by an ECC process. Operations continue to operation 510 for the next data unit and the process repeats until the transmitter no longer transmits data or the receiver no longer is configured to receive data.

Figure 6:
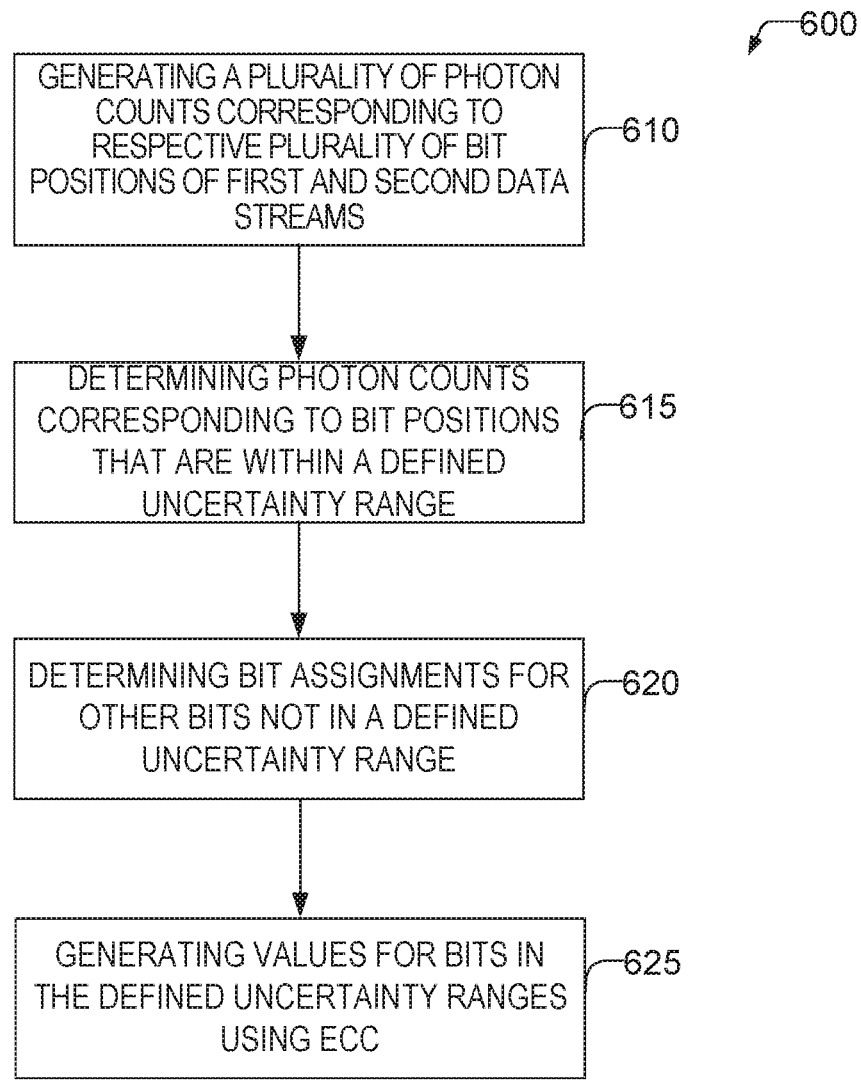
FIG. 6 illustrates a method of demultiplexing multiple data streams transmitted over an optical communication path according to an OPLM scheme with uncertainty ranges according to some examples of the present disclosure.

FIG. 6 illustrates a method 600 of demultiplexing multiple data streams transmitted over an optical communication path according to an OPLM scheme with uncertainty ranges according to some examples of the present disclosure. FIG. 6 is an example of FIG. 5. At operation 610 the receiver may generate a plurality of photon counts corresponding to respective plurality of bit positions of first and second data streams. The photons may be produced by one or more light sources in one or more transmitters transmitting one or more data streams. The photon count may be determined by a photon detector for a particular time period in which one or more bits of a plurality of bitstreams are transmitted by one or more light sources selectively activating according to a modulation scheme to transmit the one or more data streams. That is, the photon count may be the result of a transmission of a value for a particular bit position in the first and second bitstreams. The multiplexing scheme may be an OPLM scheme used in conjunction with a WDM, AM, or another modulation scheme.

At operation 615, the receiver may determine if one or more of the photon counts from operation 610 is within one or more defined ranges of uncertainty. In some examples, each range of uncertainty may be stored as a data structure with a first photon count and a second photon count. If the photon count determined at operation 610 is greater than the first photon count and less than the second photon count, than the photon count is within the defined range of uncertainty.

At operation 620, the receiver may determine bit value assignments in the first and second data streams. For example, the receiver may submit the photon count received for that bit position to one or more detection models. For example, Poisson probabilities. The highest probability returned by the detection models may be used to assign the value to the first and second streams at that bit position. This may be done for all the bit positions except those that have corresponding photon counts that are within one or more uncertainty ranges. The bit positions with corresponding photon counts within the one or more uncertainty ranges may be unassigned, may be skipped (e.g., the next photon count may be used for that bit position), may be assigned a value indicating that the value is unknown, and/or the like. In some examples, operations 610, 615 and 620 may be performed serially for each received photon count in each bit position and the results in operation 620 may be saved in a buffer or other memory.

At operation 625, the receiver may generate a value corresponding to bit positions with corresponding photon counts that lie in the uncertainty range(s) for the first and second data streams using an error correction code (ECC) process applied to the determined bit value assignments for the first and second data streams. For example, the bit values assigned by the receiver (e.g., where the photon counts are not in an uncertainty range) for each bit stream may be used by an ECC algorithm to determine the bit value assignments for the bit positions where the photon counts were in an uncertainty range. In some examples, the receiver utilizes an ECC algorithm on a particular data unit. For example, a packet, a codeword, or the like. The receiver may thus utilize other data in a particular data unit according to an ECC scheme to determine the unknown data. For example, operations 610-620 may be repeated until enough bits are received to apply the ECC algorithm.

In some examples, the size of the uncertainty ranges may be dynamically adjusted based upon a number of current unknown bits in a current data unit. For example, during reception of a particular data unit, if there are no unknown data bits, then the uncertainty ranges may be bigger than if there are 50% of the maximum number of unknown bits that may be corrected by the ECC algorithm. This allows the receiver to reduce the number of unknown bits when the ECC may determine the missing data but reduces the number of unknown bits when the ECC reaches its capacity to determine the missing data.

Example Transmitters and Receiver

Figure 7:
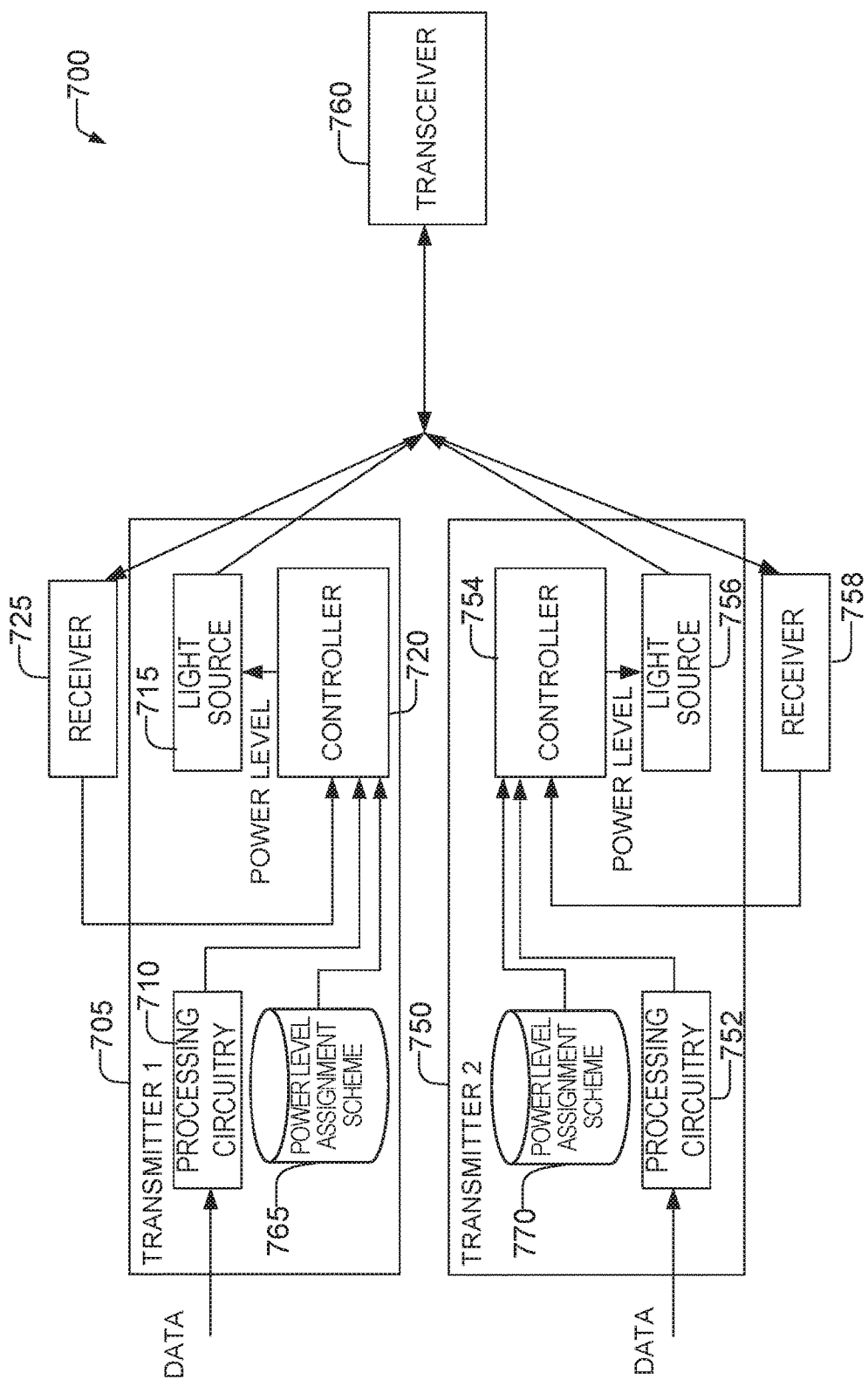
FIG. 7 illustrates a schematic of a system for increasing fiber optic bandwidth according to some examples of the present disclosure.

Turning now to FIG. 7, a schematic of a system 700 for increasing fiber optic bandwidth is shown according to some examples of the present disclosure. First transmitter 705 may include processing circuitry 710 to transform the data stream to prepare it for transmission on the fiber optic fiber. Example operations include applying an ECC, encryption, modulation operations, and the like. The transformed bits are used as a signal to the controller 720 to instruct the light source 715 to selectively turn on or off to represent the transformed bit stream according to a modulation scheme. For example, by turning the light source 715 on in response to a '1' in the bit stream and turn the light source off in response to a '0' in the bit stream. The controller 720 may set the power of the light source 715 based upon the power level indicated in an assigned power level assignment scheme and based upon a current phase of the power level assignment scheme. The power level assignment scheme is any formula or plan that is used to coordinate differing power levels across two or more transmitters. For example, the transmitters may alternate which transmitter transmits at a particular power level. The power level assignment scheme may be divided into one or more phases. A phase specifies a unit of a power level assignment scheme where each transmitter serviced by the scheme is assigned a power level for either a defined duration or until the occurrence of a defined event. The duration may be time-based, data length-based (e.g., a defined number of timeslots), or the like. In some examples, the detection models used by the receiver may be specific to the current phase of the power level assignment scheme. Power level assignment schemes may be described by one or more data structures. For example, a formula, table, chart, or other indicator. In cases in which modulation schemes that vary power are utilized, the power level may be an average power level over a particular timeslot. The indication of which power level assignment scheme is active and which phase is active may be stored in power level assignment scheme storage 765.

Light source 715 transmits light over an optical communication path which may be through a medium such as a fiber optic fiber to a receiver. Example light sources may include an LED or a LASER light source. Controller 720 and processing circuitry 710 may be general purpose processors or may be specially designed circuits configured to implement the techniques described herein. Power level assignment scheme storage 765 may be flash storage, Read Only Memory (ROM) or other transitory or non-transitory storage.

Transmitters 705 and 750 may be transceivers in that they may have associated receivers, such as receivers 725, 758. The power level assignment scheme may be assigned by the receiver 760 (which also may be a transceiver), through agreement with the second transmitter 750, or the like. The assigned power level assignment scheme may be one of a predetermined library of assignment schemes that is stored in the power level assignment scheme storage 765. In some examples, the assigned power level assignment scheme may be based upon a scheme in the library of assignment schemes but modified for one or more of the particular transmitters and receivers involved in the communication session. In yet other examples, the assigned power level assignment scheme may be custom to the particular communication session. The power level assignment scheme storage 765 may store the particular assignment scheme, a selection of the particular assignment scheme, any customizations in use, the current phase, and/or the like.

Receiver 725 may be a fiber optic receiver, but also may be an out-of-band receiver such as a WiFi receiver, a Bluetooth receiver, an ethernet receiver, or the like. Receiver 725 may receive instructions from the receiver 760 that are passed to the controller to turn on or off the light source 715 during model training for the receiver.

Second transmitter 750 may include similar components as first transmitter 705. For example, a controller 754, a light source 756, processing circuitry 752, a receiver 758, a power level assignment scheme storage 770, and the like. In some examples, if first transmitter 705 and second transmitter 750 are in a same device, one or more components may be shared between first transmitter 705 and second transmitter 750. Additionally, first transmitter 705 and second transmitter 750 may send multiple streams of data over the fiber optic cable to receiver 760 over multiple different wavelengths. Thus, the first transmitter 705 and second transmitter 750 may utilize both the techniques of the present invention to send multiple streams of data simultaneously over a same fiber by altering power levels, but also multiple streams using different wavelengths.

Figure 8:
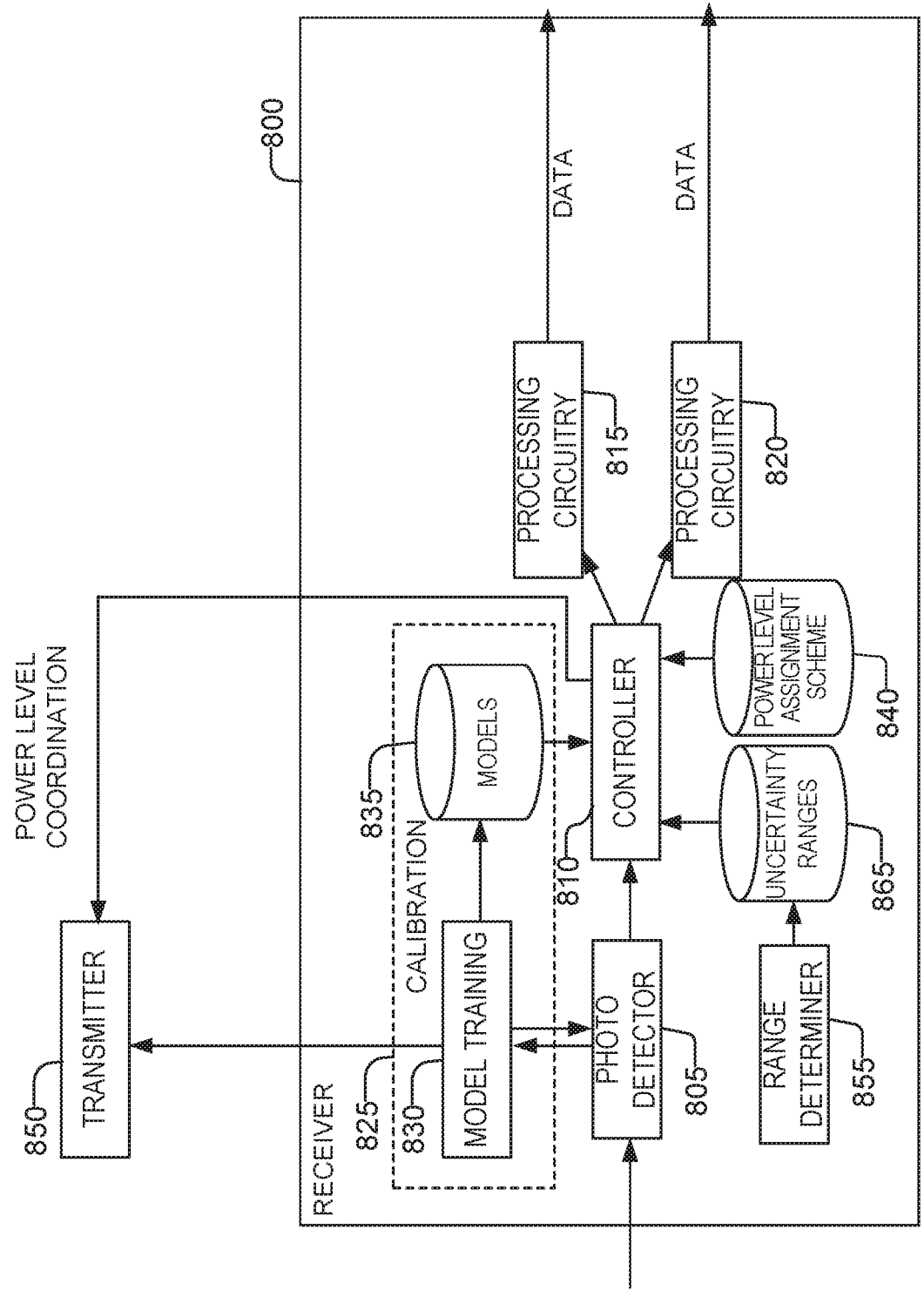
FIG. 8 illustrates a schematic of a receiver according to some examples of the present disclosure.

FIG. 8 shows a schematic of a receiver 800 according to some examples of the present disclosure. For example, receiver 800 may be an example receiver that is part of transceiver 760. Receiver 800 may include a photo detector 805 that detects and/or counts photons received over an optical communication path such as a fiber optic fiber over a predetermined time period (e.g., a timeslot). The photon counts are passed to the controller 810. Controller 810 may determine if the photon count falls within one of the uncertainty ranges stored in uncertainty ranges data store 865. If the photon count falls within an uncertainty range, the controller may skip demultiplexing the data for the current time period. In some examples, the corresponding bit position of the bitstreams may be occupied by bits demultiplexed in the next time period. In other examples, one or more indications may be inserted into the bitstream to indicate that this bit position is unknown.

If the photon count is not within one of the uncertainty ranges, the controller 810 utilizes one or more detection models stored in model storage 835 to determine individual bits in the bit streams. For example, the models may comprise one or more Poisson distributions that may return the probability that the photon counts correspond to one or more particular bit combinations for each stream. The particular detection models to use may be selected based upon the current phase of the current power level assignment scheme. The current phase and/or the selected power level assignment scheme may be stored in power level assignment scheme storage 840.

For example, consider a simple power level assignment scheme in which two light sources simultaneously transmit across a same communication path (e.g., fiber optic fiber) on a same wavelength. The power level assignment scheme alternates which of the two light sources —corresponding to two distinct data streams activates on a high power level on a bit-by-bit basis. On the first bit, stream 1 is the high power light source and stream 2 is the low power light source. The received photon counts for the period of time in which the first bit is to be transmitted is submitted to a first detection model set that includes models trained to detect the first light source activating at a high power (with the second light source being off), the second light source activating at low power (with the first light source being off), and both activated at their respective assigned powers. The detection model to return a highest score (e.g., detection probability) is used to assign values to the bit stream. For example, if the detection model trained to detect the first light source activated at a high power (with the second light source being off) returns the highest probability, then a '1' is assigned to the bit stream corresponding to the first light source and a zero to the bit stream corresponding to the second light source (e.g., based upon the modulation scheme where a '1' is indicated by activation of the light source and '0' is indicated by the light source being off).

On the second phase, stream 1 is the low power light source and stream 2 is the high-power light source. The received photon counts for the period of time in which the second bit is to be transmitted is submitted to a second detection model set that includes models trained to detect the first light source activated at a low power (with no activation of the second light source), the second light source activated at a high power (with no activation of the first light source), and both transmitting a '1' at their respective assigned powers. The detection model to return a highest score (e.g., detection probability) is used to assign values to the bit stream. For example, if the detection model trained to detect the first light source activated at a low power (with no activation of the second device) returns the highest probability, then a '1' is assigned to the bit stream corresponding to the first light source and a zero to the bit stream corresponding to the second light source.

Each bit stream determined by the controller is then passed to the processing circuitry 815 and 820 respectively, which decodes the bit stream, and performs various operations (such as an inverse of the operations performed by the processing circuitry 710 and 752 of the transmitters in FIG. 7) and outputs bitstreams to higher level layers (such as a Physical, Transport, or other network layers). Example inverse operations may include detecting and correcting errors using ECC, including correcting missing bits. In some examples, feedback from either the demultiplexing at the controller 810 and/or ECC operations at the processing circuitry 815 and 820 may be provided to the range determiner 855. Range determiner 855 may adjust the range of uncertainties using this feedback information.

Range determiner 855 may set one or more uncertainty ranges that are stored in uncertainty range data store 865 based upon one or more: ECC characteristics, detection model characteristics, or the like.

Calibration components 825 may initially train the models and may include a model training component 830 which may instruct the transmitters (through a transmitter 850) to transmit various test data sequences. The models may be built using photon counts observed by the photo detector 805. For example, by using average photon counts to create the models, or by submitting the photon counts to a training module, such as training component 910 of FIG. 9.

In some examples, the controller 810 may also select and control the power level assignment scheme. For example, by communication with the transmitters to select and/or customize a scheme. This may happen before the communication session with the transmitters and/or periodically during the communication session. In other examples, where the transmitters agree to the power level assignment scheme, the controller 810 receives messages indicating which power level assignment scheme is active. The controller may determine the current phase by messaging to and/or from one or more of the transmitters (e.g., for QoS based approaches or modifications), based upon an elapsed time from the last phase, or the like.

The controller 810, as noted, determines the phase of the power level assignment scheme (which transmitter's light source is at what power) and uses the phase to select the appropriate detection models.

Figure 9:
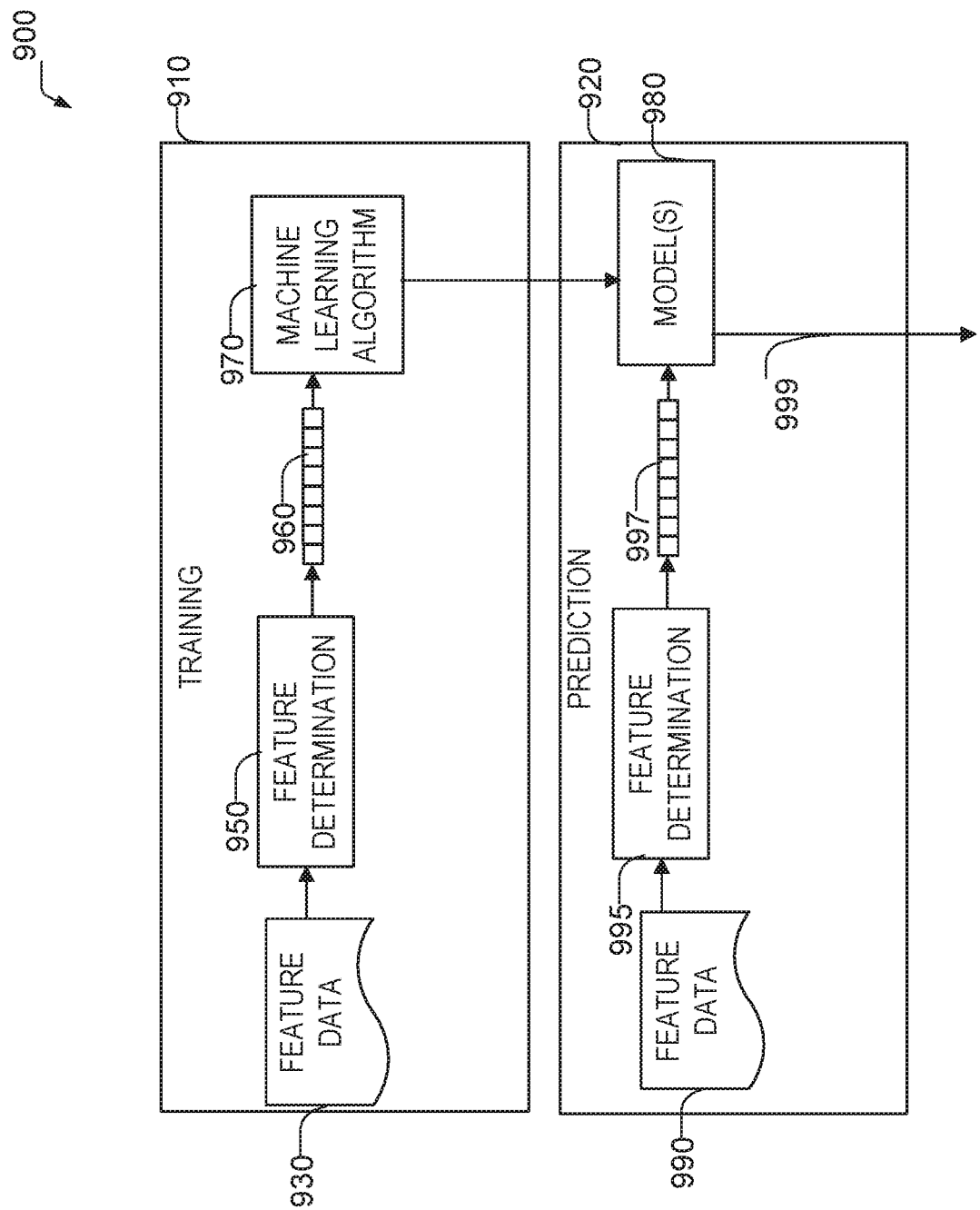
FIG. 9 illustrates an example machine learning component according to some examples of the present disclosure.

FIG. 9 shows an example machine learning component 900 according to some examples of the present disclosure. Machine learning component 900 may be used to determine detection models, power level assignment schemes, and uncertainty ranges. The machine learning component 900 may be implemented in whole or in part by the model training component 830 and/or range determiner 855. The machine learning component 900 may include a training component 910 and a prediction component 920. In some examples, the training component 910 may be implemented by a different device than the prediction component 920. In these examples, the model 980 may be created on a first machine and then sent to a second machine.

Machine learning component 900 utilizes a training component 910 and a prediction component 920. Training component 910 inputs feature data 930 into feature determination component 950. The feature data 930 may be photon counts, phases, and the like. In examples in which the model is for determining the size and position of one or more uncertainty ranges, the feature data 930 may be ECC characteristics, detection model characteristics, and the like. In examples in which the model is for determining a detection model or a power level assignment scheme the feature data may be explicitly labeled with the bit assignments for each stream, the light source(s) currently transmitting, the power level the light source(s) that are currently transmitting are transmitting at, and the like.

Feature determination component 950 determines one or more features for feature vector 960 from the feature data 930. In the examples where the model is a detection model, features of the feature vector 960 are a set of the information input and is information determined to be predictive of a bit assignment for each stream. In the examples where the model determines uncertainty ranges, features of the feature vector 960 are a set of the information input and is information determined to be predictive of an uncertainty range. Features chosen for inclusion in the feature vector 960 may be all the feature data 930 or in some examples, may be a subset of all the feature data 930. In examples in which the features chosen for the feature vector 960 are a subset of the feature data 930, a predetermined list of which feature data 930 is included in the feature vector may be utilized. The feature vector 960 may be utilized (along with any applicable labels) by the machine learning algorithm 970 to produce one or more detection models 980.

In the prediction component 920, the current feature data 990 (e.g., photon counts; power level assignment scheme information; or ECC characteristics and/or detection model characteristics) may be input to the feature determination component 995. Feature determination component 995 may determine the same set of features or a different set of features as feature determination component 950. In some examples, feature determination component 950 and 995 are the same components or different instances of the same component. Feature determination component 995 produces feature vector 997, which are input into the model 980 to determine bit assignments, phases, power level assignment schemes, uncertainty ranges, or the like 999.

The training component 910 may operate in an offline manner to train the model 980. The prediction component 920, however, may be designed to operate in an online manner. It should be noted that the model 980 may be periodically updated via additional training and/or user feedback. For example, updated features may be used to retrain or update the model(s) 980.

The machine learning algorithm 970 may be selected from among many different potential supervised or unsupervised machine learning algorithms. Examples of supervised learning algorithms include artificial neural networks, convolutional neural networks, Bayesian networks, instance-based learning, support vector machines, decision trees (e.g., Iterative Dichotomiser 3, C4.5, Classification and Regression Tree (CART), Chi-squared Automatic Interaction Detector (CHAID), and the like), random forests, linear classifiers, quadratic classifiers, k-nearest neighbor, linear regression, logistic regression, support vector machines, perceptrons, and hidden Markov models. Examples of unsupervised learning algorithms include expectation-maximization algorithms, vector quantization, and information bottleneck method. Unsupervised models may not have a training component 910. In some examples, the detection model 980 may determine a bit for each stream based upon the detected photons. In other examples, the detection model 980 may produce a score or probability for each stream that a particular bit was sent. In some examples, the model 990 may produce a size for one or more uncertainty ranges (either a single size for all, or sizes for specific detection models), a location of one or more uncertainty ranges, or both (e.g., a specific range of photons).

The machine learning models may also be used to select a power level assignment scheme. In these examples, the feature data 930, 990 may be information predictive of a proper power level assignment scheme. The features discussed above may be utilized as feature data 930, 990—such as a power budget, transmitter characteristics, receiver characteristics, and the like. The result may be a ranking and/or selection 999 of a power level assignment scheme.

The modulation schemes utilized herein have been relatively simple (on or off to represent a '1' or a '0'). In other examples, different modulation schemes may be utilized. For example, if the light sources and the receivers are capable, WDM, phase shift modulation, amplitude modulation, and other advanced modulation forms may be utilized in addition to the techniques described herein. For example, a plurality of bitstreams may be divided into a plurality of wavelengths—where each wavelength may have multiple streams of data that are sent using the methods disclosed herein. Similarly, for power modulation, a power assignment scheme of the present invention may assign multiple power levels to each transmitter—where each power level is a particular bit combination. Thus, first transmitter may be assigned power levels 1, 2, and 3 (to indicate '01', '10', and '11' bits respectively) and second transmitter may be assigned power levels 4, 5, and 6 (to indicate '01', '10', and '11' bits respectively). In this example, the system may allocate the power levels such that the average photon counts of each power level combination are distinct enough such that the probability distributions are far enough apart so that the error rate is low.

Figure 10:
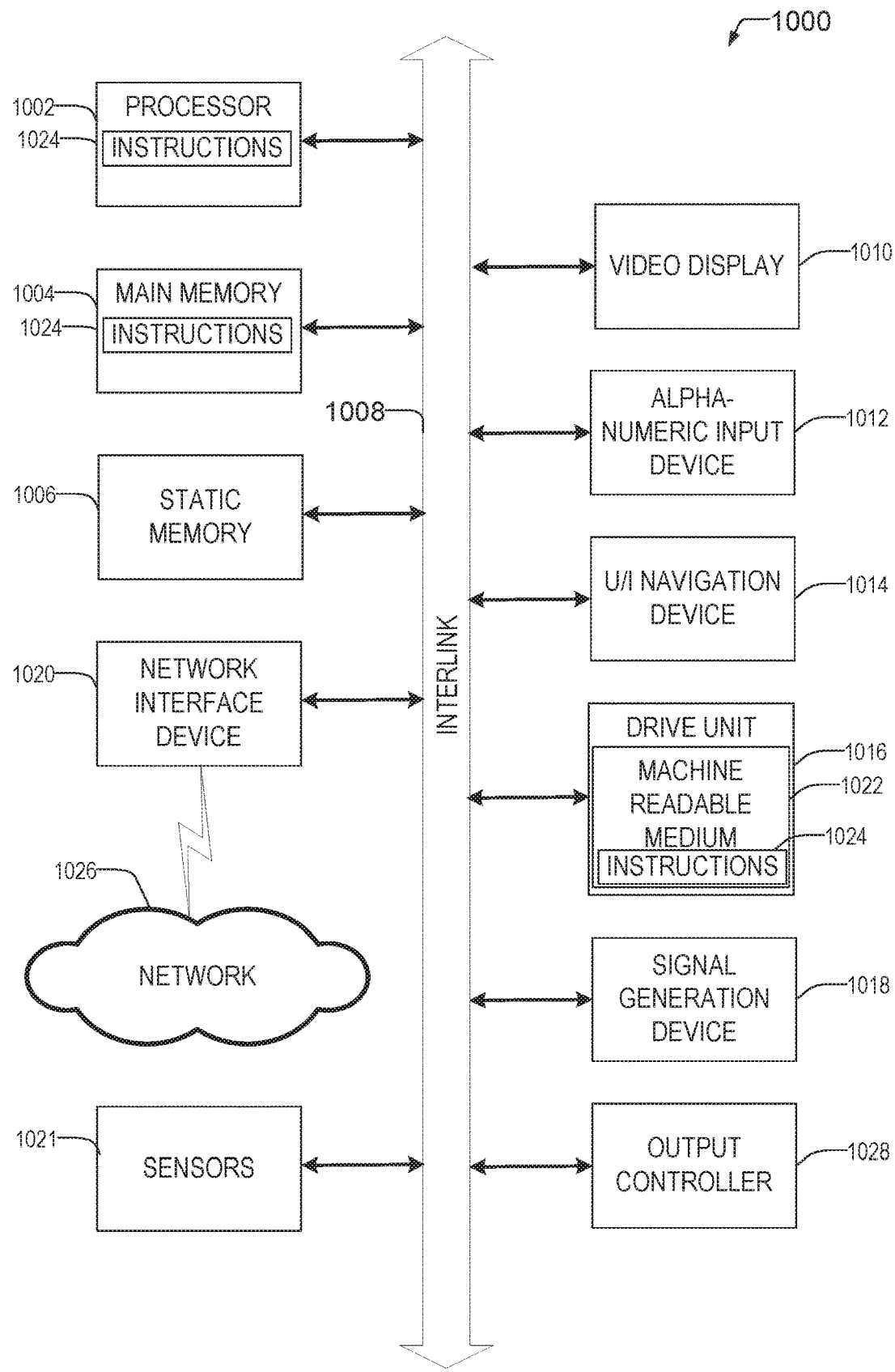
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 1000 may implement the transmitters and/or receivers disclosed herein. Furthermore, machine 1000 may include the transmitters and/or receivers disclosed herein. Machine 1000 may implement any of the methods disclosed herein. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, components, or mechanisms. Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular component at one instance of time and to constitute a different component at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine readable media.

While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 1024 may further be transmitted or received over a communications network 1026 using a transmission medium via the network interface device 1020. The Machine 1000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. In some examples, the network interface device 1020 may wirelessly communicate using Multiple User MIMO techniques.

Other Notes and Examples

Example 1 is a method for receiving multiplexed data over an optical communication path, the method comprising: using a hardware processor at a receiver: generating a plurality of photon counts corresponding to a respective plurality of bit positions of a first and a second data stream, the first and second data streams transmitted by selective activation of one or more light sources; determining that a first photon count corresponding to a first bit position of the plurality of photon counts is within a defined uncertainty range of a plurality of detection models; responsive to determining that the first photon count is within the defined uncertainty range, determining bit value assignments, for each of the plurality of bit positions except the first bit position, by assigning values in the first and second bit streams from each corresponding photon count using the plurality of detection models; and generating a value corresponding to the first bit position for the first and second data streams using an error correction code (ECC) process applied to the determined bit value assignments for the plurality of bit positions of the first and second data streams.

In Example 2, the subject matter of Example 1 includes, determining the uncertainty range based upon defined capabilities of the ECC.

In Example 3, the subject matter of Example 2 includes, wherein the defined capabilities of the ECC comprises a number of missing bits the ECC may correct without triggering a request for retransmission, and wherein the more missing bits the ECC may correct, the larger a size of the uncertainty range.

In Example 4, the subject matter of Examples 1-3 includes, determining the uncertainty range based upon characteristics of at least one of the plurality of detection models.

In Example 5, the subject matter of Example 4 includes, wherein determining the uncertainty range based upon characteristics of at least one of the plurality of detection models comprises determining the uncertainty range based upon determining a plurality of photon counts that produce a difference in probability according to a first one of the plurality of detection models and a second one of the plurality of detection models that is greater than a threshold probability difference.

In Example 6, the subject matter of Examples 4-5 includes, wherein determining the uncertainty range based upon characteristics of at least one of the plurality of detection models comprises determining the uncertainty range based upon one of: a highest possible probability of one of the plurality of detection models or a range of the one of the plurality of detection models.

In Example 7, the subject matter of Examples 1-6 includes, adjusting a size of the uncertainty range based upon a rate of instances of photon counts being within the defined uncertainty range.

Example 8 is a computing device for receiving multiplexed data over an optical communication path, the device comprising: a hardware processor configured to perform operations comprising: generating a plurality of photon counts corresponding to a respective plurality of bit positions of a first and a second data stream, the first and second data streams transmitted by selective activation of one or more light sources; determining that a first photon count corresponding to a first bit position of the plurality of photon counts is within a defined uncertainty range of a plurality of detection models; responsive to determining that the first photon count is within the defined uncertainty range, determining bit value assignments, for each of the plurality of bit positions except the first bit position, by assigning values in the first and second bit streams from each corresponding photon count using the plurality of detection models; and generating a value corresponding to the first bit position for the first and second data streams using an error correction code (ECC) process applied to the determined bit value assignments for the plurality of bit positions of the first and second data streams.

In Example 9, the subject matter of Example 8 includes, wherein the operations further comprise: determining the uncertainty range based upon defined capabilities of the ECC.

In Example 10, the subject matter of Example 9 includes, wherein the defined capabilities of the ECC comprises a number of missing bits the ECC may correct without triggering a request for retransmission, and wherein the more missing bits the ECC may correct, the larger a size of the uncertainty range.

In Example 11, the subject matter of Examples 8-10 includes, wherein the operations further comprise: determining the uncertainty range based upon characteristics of at least one of the plurality of detection models.

In Example 12, the subject matter of Example 11 includes, wherein the operations of determining the uncertainty range based upon characteristics of at least one of the plurality of detection models comprises determining the uncertainty range based upon determining a plurality of photon counts that produce a difference in probability according to a first one of the plurality of detection models and a second one of the plurality of detection models that is greater than a threshold probability difference.

In Example 13, the subject matter of Examples 11-12 includes, wherein the operations of determining the uncertainty range based upon characteristics of at least one of the plurality of detection models comprises determining the uncertainty range based upon one of: a highest possible probability of one of the plurality of detection models or a range of the one of the plurality of detection models.

In Example 14, the subject matter of Examples 8-13 includes, wherein the operations comprise adjusting a size of the uncertainty range based upon a rate of instances of photon counts being within the defined uncertainty range.

Example 15 is a machine-readable medium storing instructions for receiving multiplexed data over an optical communication path, the instructions, when executed by a machine, cause the machine to perform operations comprising: generating a plurality of photon counts corresponding to a respective plurality of bit positions of a first and a second data stream, the first and second data streams transmitted by selective activation of one or more light sources; determining that a first photon count corresponding to a first bit position of the plurality of photon counts is within a defined uncertainty range of a plurality of detection models; responsive to determining that the first photon count is within the defined uncertainty range, determining bit value assignments, for each of the plurality of bit positions except the first bit position, by assigning values in the first and second bit streams from each corresponding photon count using the plurality of detection models; and generating a value corresponding to the first bit position for the first and second data streams using an error correction code (ECC) process applied to the determined bit value assignments for the plurality of bit positions of the first and second data streams.

In Example 16, the subject matter of Example 15 includes, wherein the operations further comprise: determining the uncertainty range based upon defined capabilities of the ECC.

In Example 17, the subject matter of Example 16 includes, wherein the defined capabilities of the ECC comprises a number of missing bits the ECC may correct without triggering a request for retransmission, and wherein the more missing bits the ECC may correct, the larger a size of the uncertainty range.

In Example 18, the subject matter of Examples 15-17 includes, wherein the operations further comprise: determining the uncertainty range based upon characteristics of at least one of the plurality of detection models.

In Example 19, the subject matter of Example 18 includes, wherein the operations of determining the uncertainty range based upon characteristics of at least one of the plurality of detection models comprises determining the uncertainty range based upon determining a plurality of photon counts that produce a difference in probability according to a first one of the plurality of detection models and a second one of the plurality of detection models that is greater than a threshold probability difference.

In Example 20, the subject matter of Examples 18-19 includes, wherein the operations of determining the uncertainty range based upon characteristics of at least one of the plurality of detection models comprises determining the uncertainty range based upon one of: a highest possible probability of one of the plurality of detection models or a range of the one of the plurality of detection models.

In Example 21, the subject matter of Examples 15-20 includes, wherein the operations comprise adjusting a size of the uncertainty range based upon a rate of instances of photon counts being within the defined uncertainty range.

Example 22 is a device for receiving multiplexed data over an optical communication path, the device comprising: means for generating a plurality of photon counts corresponding to a respective plurality of bit positions of a first and a second data stream, the first and second data streams transmitted by selective activation of one or more light sources; means for determining that a first photon count corresponding to a first bit position of the plurality of photon counts is within a defined uncertainty range of a plurality of detection models; responsive to determining that the first photon count is within the defined uncertainty range, means for determining bit value assignments, for each of the plurality of bit positions except the first bit position, by assigning values in the first and second bit streams from each corresponding photon count using the plurality of detection models; and means for generating a value corresponding to the first bit position for the first and second data streams using an error correction code (ECC) process applied to the determined bit value assignments for the plurality of bit positions of the first and second data streams.

In Example 23, the subject matter of Example 22 includes, means for determining the uncertainty range based upon defined capabilities of the ECC.

In Example 24, the subject matter of Example 23 includes, wherein the defined capabilities of the ECC comprises a number of missing bits the ECC may correct without triggering a request for retransmission, and wherein the more missing bits the ECC may correct, the larger a size of the uncertainty range.

In Example 25, the subject matter of Examples 22-24 includes, means for determining the uncertainty range based upon characteristics of at least one of the plurality of detection models.

In Example 26, the subject matter of Example 25 includes, wherein the means for determining the uncertainty range based upon characteristics of at least one of the plurality of detection models comprises means for determining the uncertainty range based upon determining a plurality of photon counts that produce a difference in probability according to a first one of the plurality of detection models and a second one of the plurality of detection models that is greater than a threshold probability difference.

In Example 27, the subject matter of Examples 25-26 includes, wherein the means for determining the uncertainty range based upon characteristics of at least one of the plurality of detection models comprises means for determining the uncertainty range based upon one of: a highest possible probability of one of the plurality of detection models or a range of the one of the plurality of detection models.

In Example 28, the subject matter of Examples 22-27 includes, means for adjusting a size of the uncertainty range based upon a rate of instances of photon counts being within the defined uncertainty range.

Example 29 is a method for receiving data over an optical communication path, the method comprising: using a hardware processor at a receiver: determining that a photon count of photons produced by a light source at a transmitter, is within a defined uncertainty range; responsive to determining that the photon count is within the defined uncertainty range, refraining from assigning any bits to a first bit position in first and second data streams using the photon count during a demultiplexing operation; and determining a bit assignment for the first bit position for the first and second data streams using an error correction code (ECC) applied to other bits of the first and second data streams.

In Example 30, the subject matter of Example 29 includes, determining the uncertainty range based upon defined capabilities of the ECC.

In Example 31, the subject matter of Example 30 includes, wherein the defined capabilities of the ECC comprise a number of missing bits the ECC may correct without triggering a request for retransmission.

In Example 32, the subject matter of Example 31 includes, wherein the more missing bits the ECC may correct, the larger a size of the uncertainty range.

In Example 33, the subject matter of Examples 29-32 includes, determining the uncertainty range based upon characteristics of one or more detection models used to demultiplex the photon count into bit assignments for the first and second data streams.

In Example 34, the subject matter of Example 33 includes, wherein determining the uncertainty range based upon characteristics of the one or more detection models comprises determining the uncertainty range based upon determining a plurality of photon counts that produce a difference in probability according to a first one of the one or more detection models and a second one of the one or more detection models that is greater than a threshold probability difference.

In Example 35, the subject matter of Examples 33-34 includes, wherein the characteristics of the one or more detection models comprises one of: a highest possible probability of the one or more detection models or a range of the one or more detection models.

In Example 36, the subject matter of Examples 29-35 includes, determining the uncertainty range based upon characteristics of one or more detection models and based upon defined capabilities of the ECC.

In Example 37, the subject matter of Examples 29-36 includes, wherein a size of the uncertainty range is fixed.

In Example 38, the subject matter of Examples 29-37 includes, wherein a size of the uncertainty range is dynamically updated in response to changes in the one of: capabilities of the ECC or characteristics of one or more detection models.

Example 39 is a device for receiving data over an optical communication path, the device comprising: a hardware processor; a memory, storing instructions, which when executed by the processor cause the device to perform operations comprising: determining that a photon count of photons produced by a light source at a transmitter, is within a defined uncertainty range; responsive to determining that the photon count is within the defined uncertainty range, refraining from assigning any bits to a first bit position in first and second data streams using the photon count during a demultiplexing operation; and determining a bit assignment for the first bit position for the first and second data streams using an error correction code (ECC) applied to other bits of the first and second data streams.

In Example 40, the subject matter of Example 39 includes, wherein the operations further comprise: determining the uncertainty range based upon defined capabilities of the ECC.

In Example 41, the subject matter of Example 40 includes, wherein the defined capabilities of the ECC comprise a number of missing bits the ECC may correct without triggering a request for retransmission.

In Example 42, the subject matter of Example 41 includes, wherein the more missing bits the ECC may correct, the larger a size of the uncertainty range.

In Example 43, the subject matter of Examples 39-42 includes, wherein the operations further comprise: determining the uncertainty range based upon characteristics of one or more detection models used to demultiplex the photon count into bit assignments for the first and second data streams.

In Example 44, the subject matter of Example 43 includes, wherein the operations of determining the uncertainty range based upon characteristics of the one or more detection models comprises determining the uncertainty range based upon determining a plurality of photon counts that produce a difference in probability according to a first one of the one or more detection models and a second one of the one or more detection models that is greater than a threshold probability difference.

In Example 45, the subject matter of Examples 43-44 includes, wherein the characteristics of the one or more detection models comprises one of: a highest possible probability of the one or more detection models or a range of the one or more detection models.

In Example 46, the subject matter of Examples 39-45 includes, wherein the operations further comprise: determining the uncertainty range based upon characteristics of one or more detection models and based upon defined capabilities of the ECC.

In Example 47, the subject matter of Examples 39-46 includes, wherein a size of the uncertainty range is fixed.

In Example 48, the subject matter of Examples 39-47 includes, wherein a size of the uncertainty range is dynamically updated in response to changes in the one of: capabilities of the ECC or characteristics of one or more detection models.

Example 49 is a machine readable medium storing instructions for receiving data over an optical communication path, the instructions, when executed by a machine, cause the machine to perform operations comprising: determining that a photon count of photons produced by a light source at a transmitter, is within a defined uncertainty range; responsive to determining that the photon count is within the defined uncertainty range, refraining from assigning any bits to a first bit position in first and second data streams using the photon count during a demultiplexing operation; and determining a bit assignment for the first bit position for the first and second data streams using an error correction code (ECC) applied to other bits of the first and second data streams.

In Example 50, the subject matter of Example 49 includes, wherein the operations further comprise: determining the uncertainty range based upon defined capabilities of the ECC.

In Example 51, the subject matter of Example 50 includes, wherein the defined capabilities of the ECC comprise a number of missing bits the ECC may correct without triggering a request for retransmission.

In Example 52, the subject matter of Example 51 includes, wherein the more missing bits the ECC may correct, the larger a size of the uncertainty range.

In Example 53, the subject matter of Examples 49-52 includes, wherein the operations further comprise: determining the uncertainty range based upon characteristics of one or more detection models used to demultiplex the photon count into bit assignments for the first and second data streams.

In Example 54, the subject matter of Example 53 includes, wherein the operations of determining the uncertainty range based upon characteristics of the one or more detection models comprises determining the uncertainty range based upon determining a plurality of photon counts that produce a difference in probability according to a first one of the one or more detection models and a second one of the one or more detection models that is greater than a threshold probability difference.

In Example 55, the subject matter of Examples 53-54 includes, wherein the characteristics of the one or more detection models comprises one of: a highest possible probability of the one or more detection models or a range of the one or more detection models.

In Example 56, the subject matter of Examples 49-55 includes, wherein the operations further comprise: determining the uncertainty range based upon characteristics of one or more detection models and based upon defined capabilities of the ECC.

In Example 57, the subject matter of Examples 49-56 includes, wherein a size of the uncertainty range is fixed.

In Example 58, the subject matter of Examples 49-57 includes, wherein a size of the uncertainty range is dynamically updated in response to changes in the one of: capabilities of the ECC or characteristics of one or more detection models.

Example 59 is a device for receiving data over an optical communication path, the method comprising: means for determining that a photon count of photons produced by a light source at a transmitter, is within a defined uncertainty range; means for responsive to determining that the photon count is within the defined uncertainty range, refraining from assigning any bits to a first bit position in first and second data streams using the photon count during a demultiplexing operation; and means for determining a bit assignment for the first bit position for the first and second data streams using an error correction code (ECC) applied to other bits of the first and second data streams.

In Example 60, the subject matter of Example 59 includes, means for determining the uncertainty range based upon defined capabilities of the ECC.

In Example 61, the subject matter of Example 60 includes, wherein the defined capabilities of the ECC comprise a number of missing bits the ECC may correct without triggering a request for retransmission.

In Example 62, the subject matter of Example 61 includes, wherein the more missing bits the ECC may correct, the larger a size of the uncertainty range.

In Example 63, the subject matter of Examples 59-62 includes, means for determining the uncertainty range based upon characteristics of one or more detection models used to demultiplex the photon count into bit assignments for the first and second data streams.

In Example 64, the subject matter of Example 63 includes, wherein the means for determining the uncertainty range based upon characteristics of the one or more detection models comprises means for determining the uncertainty range based upon determining a plurality of photon counts that produce a difference in probability according to a first one of the one or more detection models and a second one of the one or more detection models that is greater than a threshold probability difference.

In Example 65, the subject matter of Examples 63-64 includes, wherein the characteristics of the one or more detection models comprises one of: a highest possible probability of the one or more detection models or a range of the one or more detection models.

In Example 66, the subject matter of Examples 59-65 includes, means for determining the uncertainty range based upon characteristics of one or more detection models and based upon defined capabilities of the ECC.

In Example 67, the subject matter of Examples 59-66 includes, wherein a size of the uncertainty range is fixed.

In Example 68, the subject matter of Examples 59-67 includes, wherein a size of the uncertainty range is dynamically updated in response to changes in the one of: capabilities of the ECC or characteristics of one or more detection models.

Example 69 is at least one machine-readable medium including instructions that, when executed by processing circuitry, cause the processing circuitry to perform operations to implement of any of Examples 1-68.

Example 70 is an apparatus comprising means to implement of any of Examples 1-68.

Example 71 is a system to implement of any of Examples 1-68.

Example 72 is a method to implement of any of Examples 1-68.

What is claimed is:

1. A method for receiving multiplexed data over an optical communication path, the method comprising:
   using a hardware processor at a receiver:
      generating a plurality of photon counts corresponding to a respective plurality of bit positions of a first and a second data stream, the first and second data streams transmitted by selective activation of one or more light sources;
      determining that a first photon count corresponding to a first bit position of the plurality of photon counts is within a defined uncertainty range of a plurality of detection models;
      responsive to determining that the first photon count is within the defined uncertainty range, determining bit value assignments, for each of the plurality of bit positions except the first bit position, by assigning values in the first and second bit streams from each corresponding photon count using the plurality of detection models; and
      generating a value corresponding to the first bit position for the first and second data streams using an error correction code (ECC) process applied to the determined bit assignments for the plurality of bit positions of the first and second data streams.

2. The method of claim 1, further comprising:
   determining the uncertainty range based upon defined characteristics of the ECC.

3. The method of claim 2, wherein the defined characteristics of the ECC comprises a number of missing bits the ECC may correct without triggering a request for retransmission, and wherein the more missing bits the ECC may correct, the larger a size of the uncertainty range.

4. The method of claim 1, further comprising:
   determining the uncertainty range based upon characteristics of at least one of the plurality of detection models.

5. The method of claim 4, wherein determining the uncertainty range based upon characteristics of at least one of the plurality of detection models comprises determining the uncertainty range based upon determining a plurality of photon counts that produce a difference in probability according to a first one of the plurality of detection models and a second one of the plurality of detection models that is greater than a threshold probability difference.

6. The method of claim 4, wherein determining the uncertainty range based upon characteristics of at least one of the plurality of detection models comprises determining the uncertainty range based upon one of:
   a highest possible probability of one of the plurality of detection models or a range of the one of the plurality of detection models.

7. The method of claim 1; further comprising adjusting a size of the uncertainty range based upon a rate of instances of photon counts being within the defined uncertainty range.

8. A computing device for receiving multiplexed data over an optical communication path, the device comprising:
   a hardware processor configured to perform operations comprising:
      generating a plurality of photon counts corresponding to a respective plurality of bit positions of a first and a second data stream, the first and second data streams transmitted by selective activation of one or more light sources;
      determining that a first photon count corresponding to a first bit position of the plurality of photon counts is within a defined uncertainty range of a plurality of detection models;
      responsive to determining that the first photon count is within the defined uncertainty range, determining bit value assignments, for each of the plurality of bit positions except the first bit position, by assigning values in the first and second bit streams from each corresponding photon count using the plurality of detection models; and
      generating a value corresponding to the first bit position for the first and second data streams using an error correction code (ECC) process applied to the determined bit value assignments for the plurality of bit positions of the first and second data streams.

9. The computing device of claim 8, wherein the operations further comprise:
   determining the uncertainty range based upon defined characteristics of the ECC.

10. The computing device of claim 9, wherein the defined characteristics of the ECC comprises a number of missing bits the ECC may correct without triggering a request for retransmission, and wherein the more missing bits the ECC may correct, the larger a size of the uncertainty range.

11. The computing device of claim 8, wherein the operations further comprise:
   determining the uncertainty range based upon characteristics of at least one of the plurality of detection models.

12. The computing device of claim 11, wherein the operations of determining the uncertainty range based upon characteristics of at least one of the plurality of detection models comprises determining the uncertainty range based upon determining a plurality of photon counts that produce a difference in probability according to a first one of the plurality of detection models and a second one of the plurality of detection models that is greater than a threshold probability difference.

13. The computing device of claim 11, wherein the operations of determining the uncertainty range based upon characteristics of at least one of the plurality of detection models comprises determining the uncertainty range based upon one of:
   a highest possible probability of one of the plurality of detection models or a range of the one of the plurality of detection models.

14. The computing device of claim 8, wherein the operations comprise adjusting a size of the uncertainty range based upon a rate of instances of photon counts being within the defined uncertainty range.

15. A machine-readable medium storing instructions for receiving multiplexed data over an optical communication path, the instructions, when executed by a machine, cause the machine to perform operations comprising:
- generating a plurality of photon counts corresponding to a respective plurality of bit positions of a first and a second data stream, the first and second data streams transmitted by selective activation of one or more light sources;
- determining that a first photon count corresponding to a first bit position of the plurality of photon counts is within a defined uncertainty range of a plurality of detection models;
- responsive to determining that the first photon count is within the defined uncertainty range, determining bit value assignments, for each of the plurality of bit positions except the first bit position, by assigning values in the first and second bit streams from each corresponding photon count using the plurality of detection models; and
- generating a value corresponding to the first bit position for the first and second data streams using an error correction code (ECC) process applied to the determined bit value assignments for the plurality of bit positions of the first and second data streams.

16. The machine-readable medium of claim 15, wherein the operations further comprise:
- determining the uncertainty range based upon defined characteristics of the ECC.

17. The machine-readable medium of claim 16, wherein the defined characteristics of the ECC comprises a number of missing bits the ECC may correct without triggering a request for retransmission, and wherein the more missing bits the ECC may correct, the larger a size of the uncertainty range.

18. The machine-readable medium of claim 15, wherein the operations further comprise:
- determining the uncertainty range based upon characteristics of at least one of the plurality of detection models.

19. The machine-readable medium of claim 18, wherein the operations of determining the uncertainty range based upon characteristics of at least one of the plurality of detection models comprises determining the uncertainty range based upon determining a plurality of photon counts that produce a difference in probability according to a first one of the plurality of detection models and a second one of the plurality of detection models that is greater than a threshold probability difference.

20. The machine-readable medium of claim 18, wherein the operations of determining the uncertainty range based upon characteristics of at least one of the plurality of detection models comprises determining the uncertainty range based upon one of: a highest possible probability of one of the plurality of detection models or a range of the one of the plurality of detection models.

* * * * *